(12) United States Patent
Yamashita

(10) Patent No.: US 8,396,215 B2
(45) Date of Patent: Mar. 12, 2013

(54) SIGNAL TRANSMISSION APPARATUS AND SIGNAL TRANSMISSION METHOD

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 666 days.

(21) Appl. No.: 12/574,743

(22) Filed: Oct. 7, 2009

(65) Prior Publication Data

US 2010/0091989 A1    Apr. 15, 2010

(30) Foreign Application Priority Data

Oct. 9, 2008    (JP) ................ P2008-263243

(51) Int. Cl.
    *G06F 21/00*    (2006.01)
(52) U.S. Cl. ......... 380/210; 380/212; 380/221; 380/225
(58) Field of Classification Search .................. 380/210, 380/212, 221, 225
    See application file for complete search history.

(56) References Cited

U.S. PATENT DOCUMENTS

2008/0031450 A1    2/2008    Yamashita

FOREIGN PATENT DOCUMENTS

| EP | 2 139 236 | 12/2009 |
|---|---|---|
| JP | 2008 28651 | 2/2008 |
| JP | 2008 42408 | 2/2008 |
| JP | 2008-99189 | 4/2008 |

*Primary Examiner* — Benjamin Lanier
(74) *Attorney, Agent, or Firm* — Frommer Lawrence & Haug LLP; William S. Frommer

(57) ABSTRACT

A signal transmission apparatus includes: a serial-to-parallel conversion unit serial-to-parallel converting HD-SDI format serial digital video signals of Link A containing CH1, CH3, CH5, and CH7, and Link B containing CH2, CH4, CH6, and CH8; a scrambler rewriting a specified timing reference signal among data of horizontal lines in converted Link A into a predetermined value, applying scrambling to only specified data, performing encoding, and outputting at least up to several bits of data following an error detection code; an extracting unit extracting RGB bits only from specified data among data of horizontal lines in converted Link B; an 8-bit/10-bit encoder subjecting the extracted RGB bits of the Link B to 8-bit/10-bit encoding; a multiplexing unit multiplexing scrambled parallel digital data of the Link A and encoded parallel digital data of the Link B; and a serial digital data generating unit generating serial digital data from the parallel digital data.

4 Claims, 17 Drawing Sheets

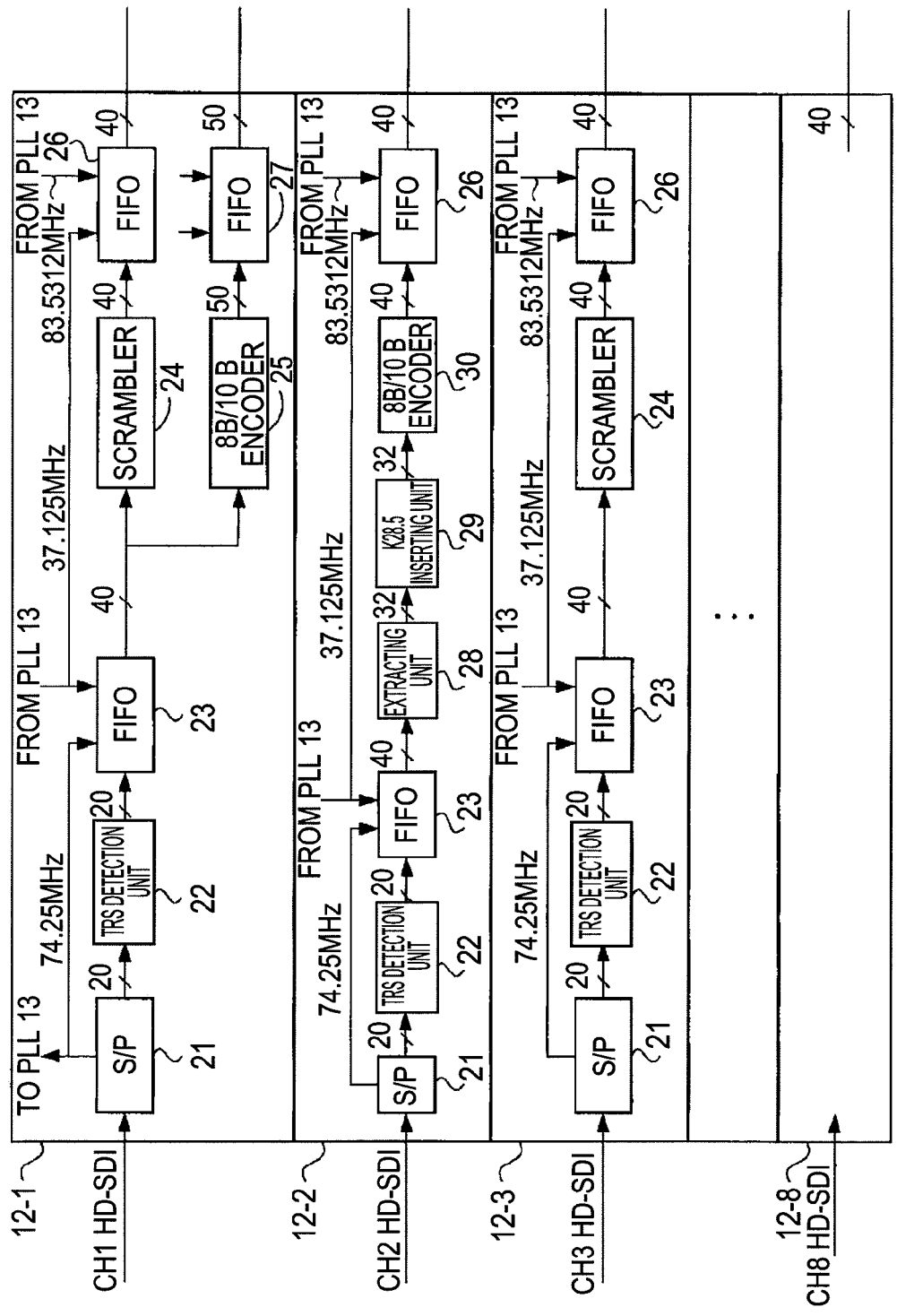

FIG.7A
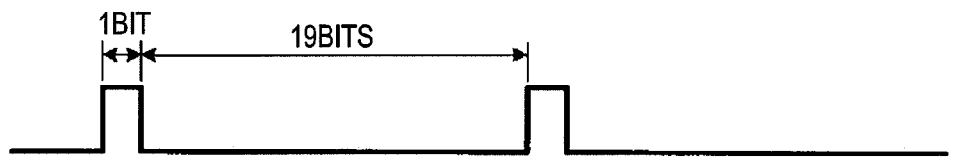
FIG.7B
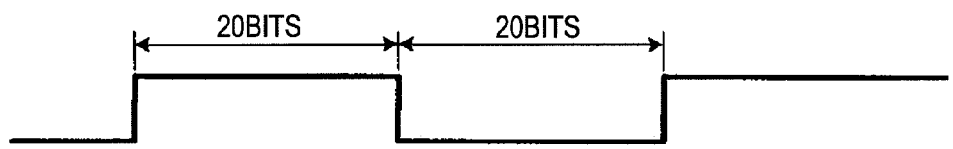
FIG.8
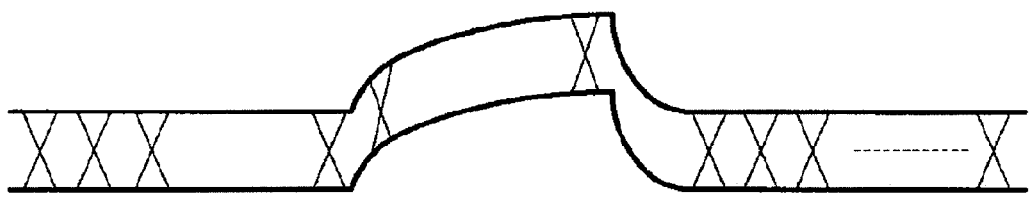
FIG.9
| WORD | 9 (MSB) | 8 | 7 | 6 | 5 | 4 | 3 | 2 | 1 | 0 (LSB) |
|------|---------|---|---|---|---|---|---|---|---|---------|
| XYZ  | 1       | F | V | H | P3 | P2 | P1 | P0 | 0 | 0 |

FIG.11A
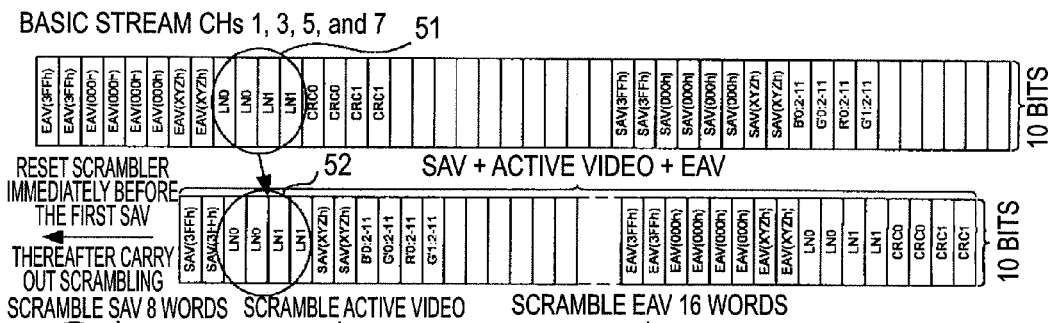
FIG.11B
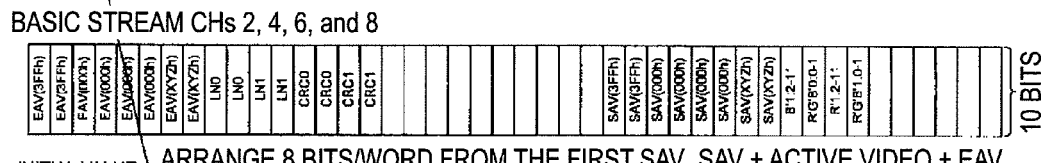
FIG.11C
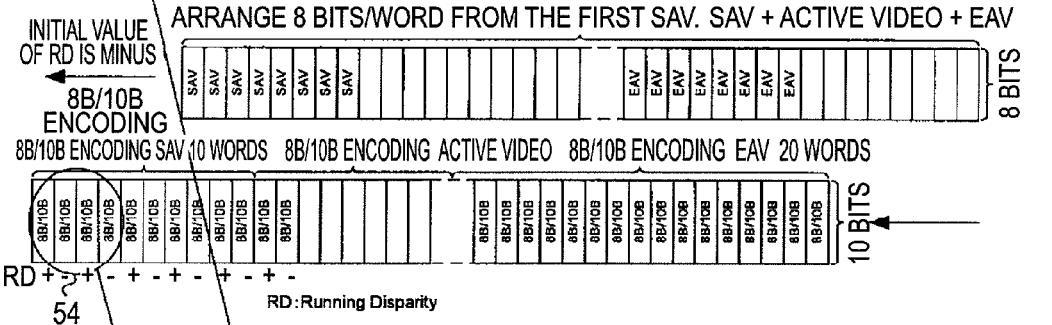
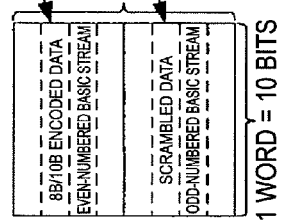

EXAMPLE OF DATA STRUCTURE OF 1 LINE FORMED IN DATA LENGTH CONVERSION UNIT IN THE CASE OF 25P

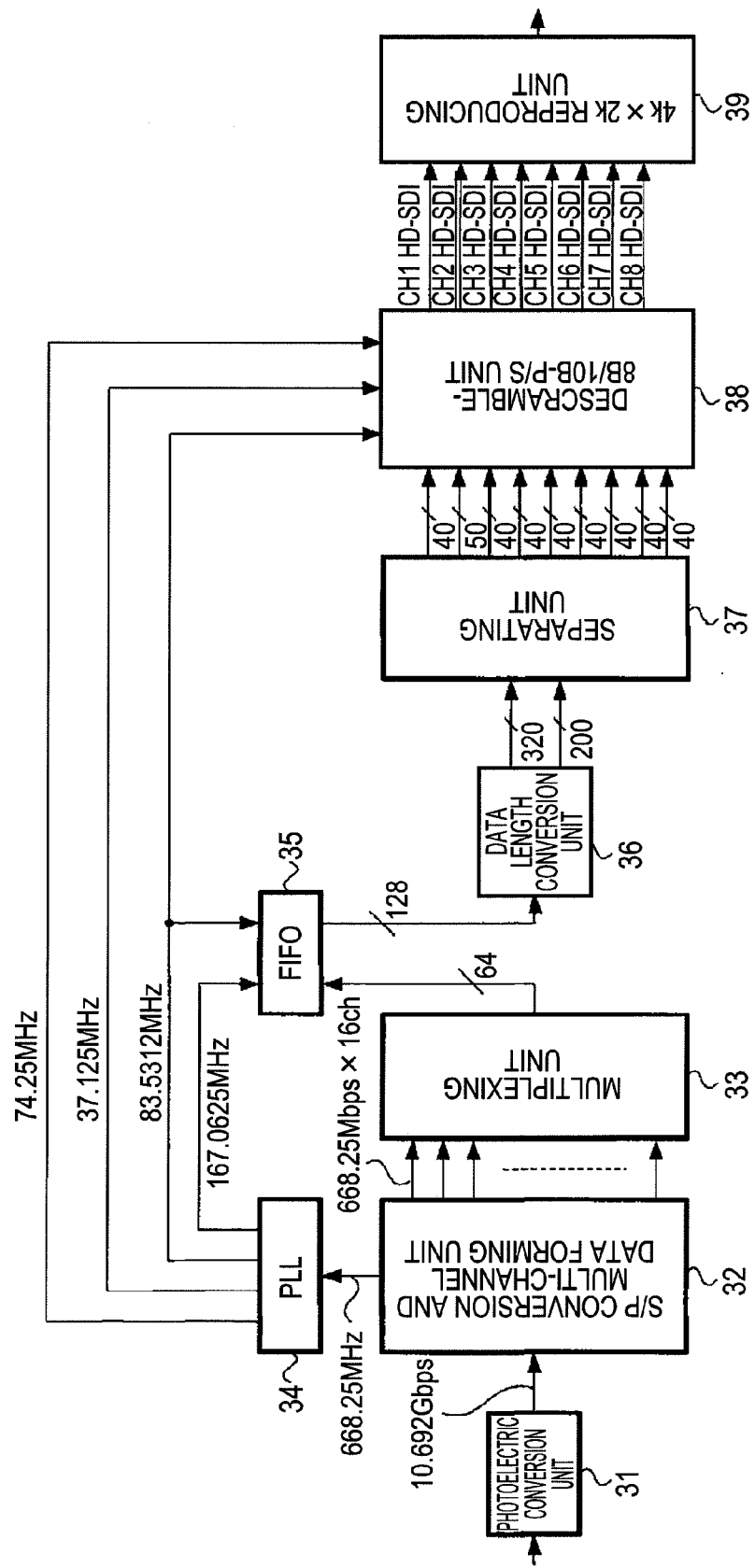

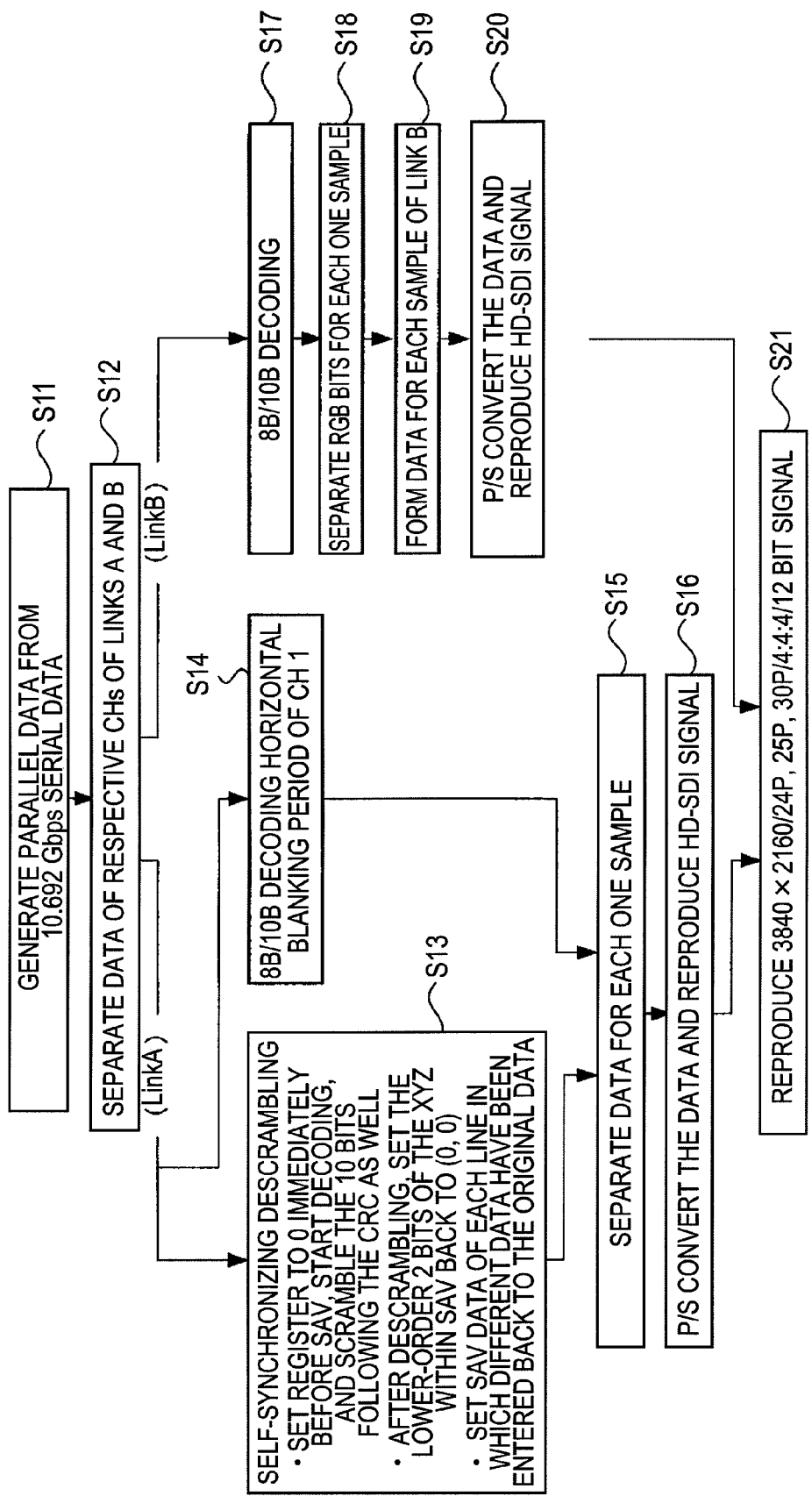

FIG.20A
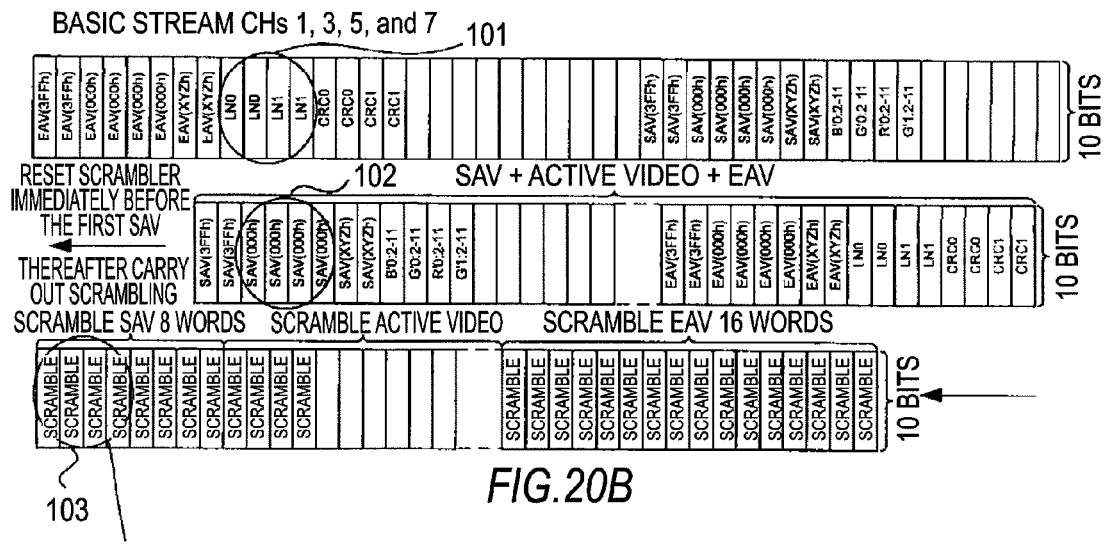
FIG.20B
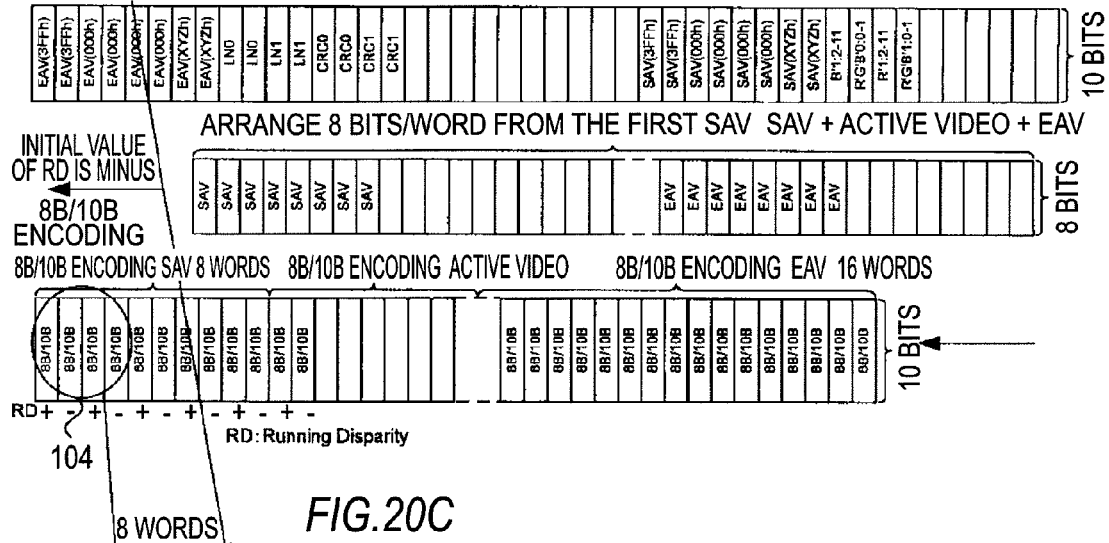
FIG.20C

SIGNAL TRANSMISSION APPARATUS AND SIGNAL TRANSMISSION METHOD

BACKGROUND OF THE INVENTION

1. Field of the Invention

The present invention relates to a signal transmission apparatus and a signal transmission method that are suitable for, for example, when serially transmitting 3840×2160/24P, 24/1.001P, 25P, 30P, 30/1.001P/4:4:4/12 bit signals at a bit rate of 10 Gbps or higher.

2. Description of Related Art

The present applicant has already disclosed a technology for serially transmitting 3840×2160/24P, 24/1.001P, 25P, 30P, 30/1.001P/4:4:4/12 bit signals at a bit rate of 10 Gbps or higher. The 3840×2160/24P, 24/1.001P, 25P, 30P, 30/1.001P/4:4:4/12 bit signal is one type of 4 k×2 k signals (ultra-high resolution signals of 4 k samples×2 k lines). (See, for example, JP-A-2008-99189.)

SUMMARY OF THE INVENTION

It has been found that the technology disclosed in JP-A-2008-99189 is incapable of generating a video signal that constitutes a screen formed of a single color (i.e., a flat field) in the case of attempting to serially transmitting a 4 k×2 k signal. This point will be discussed with reference to FIGS. 20A to 20C.

FIGS. 20A to 20C illustrate charts showing an example of transmission of basic stream in the related art.

FIG. 20A shows an example of the data structure in the case of transmitting basic stream CHs 1, 3, 5, and 7.

In the related art, a field 101 that follows EAV of the basic stream CHs 1, 3, 5, and 7 contains (LN0, LN0, LN1, and LN1). The data (000h, 000h, 000h, 000h) represented as a field 102 in the SAV (3FFh, 3FFh, 000h, 000h, 000h, 000h, XYZ, ZYZh) of the CHs 1, 3, 5, and 7 are scrambled as they are. At this time, the lower 2 bits of CXYZh are rewritten into (0, 0), (0, 1), (1, 0), and (1, 1) in the CHs 1, 3, 5, and 7, respectively.

FIG. 20B shows an example of the data structure in the case of transmitting basic stream CHs 2, 4, 6, and 8.

The basic stream CHs 2, 4, 6, and 8 are converted into video signals each containing SAV, active video, and EAV. Note that these video signals are subjected to 8 B/10 B conversion.

FIG. 20C shows an example of a 10-bit 8-word data structure.

A field 103 shown in FIG. 20A and a field 104 shown in FIG. 20B are inserted into the 10-bit 8-word data, respectively.

Here, the field 103 contains data in which the original data are scrambled. Therefore, a word synchronization signal of the 8 B/10 B code that corresponds to K28.5 signal may be generated erroneously. For example, if a word synchronization signal of the 8 B/10 B code that corresponds to K28.5 signal is generated in the case where a video signal with a single color is scrambled, this word synchronization signal of the 8 B/10 B code will be output at the same horizontal position in one field. The output of the video signal is controlled by a state machine, so when this word synchronization signal of the 8 B/10 B code is output at the same horizontal position in one field continuously, the boundary of the word of the video signal output is mistaken. As a consequence, it may become impossible to output a video signal for a flat field.

Accordingly, it will be desirable that a flat field video signal can be output in a suitable manner.

In an embodiment of the invention, HD-SDI format serial digital video signals of CH1 to CH8 mapped according to a predetermined transmission standard are serial-to-parallel converted. Here, CH1 to CH8 include Link A, which contains CH1, CH3, CH5, and CH7, and Link B, which contains CH2, CH4, CH6, and CH8.

Next, among the data of the horizontal lines of Link A that have been serial-to-parallel converted, a timing reference signal SAV specified as 000h, 000h, 000h, 000h is rewritten into predetermined values.

Next, by a scrambler, self-synchronizing scrambling is applied to only the data of the timing reference signal SAV, an active line, a timing reference signal EAV, a line number LN, and an error detection code CRC.

Next, encoding is performed while setting all the values of registers in the scrambler to 0 immediately before the timing reference signal SAV, and at least up to several bits of data following the error detection code CRC are output.

Next, among the data of horizontal lines in Link B that have been serial-to-parallel converted, RGB bits are extracted only from the data of the timing reference signal SAV, the active line, the timing reference signal EAV, the line number LN, and the error detection code CRC.

Next, the extracted RGB bits in Link B are subjected to 8-bit/10-bit encoding.

Next, the parallel digital data of Link A, to which self-synchronizing scrambling is applied, and the parallel digital data of Link B, which have been subjected to 8-bit/10-bit encoding, are multiplexed.

Then, serial digital data with a predetermined bit rate are generated from the multiplexed parallel digital data.

Thus, HD-SDI format serial digital video signals of CH1 to CH8 mapped according to a transmission standard are serial-to-parallel converted. For the Link A, self-synchronizing scrambling is applied to only the data of the timing reference signal SAV, the active line, the timing reference signal EAV, the line number LN, and the error detection code CRC. On the other hand, the self-synchronizing scrambling is not applied to the data of the horizontal blanking period. Then, encoding is performed while setting all the register values in the scrambler to 0 immediately before the timing reference signal SAV, and at least up to several bits of data following the error detection code CRC are output.

For Link B, RGB bits are extracted from only the data of the timing reference signal SAV, the active line, the timing reference signal EAV, the line number LN, and the error detection code CRC, among the data of the horizontal lines. The RGB bits are subjected to 8-bit/10-bit encoding. Then, the data of Link A to which self-synchronizing scrambling is applied and the data of Link B that are subjected to 8-bit/10-bit encoding are multiplexed. Serial digital data at a predetermined bit rate are generated from the multiplexed parallel digital data.

According to the embodiment of the invention, the timing reference signal SAV specified as 000h, 000h, 000h, 000h among the data of the horizontal lines in Link A that have been serial-to-parallel converted is rewritten into predetermined values. These data are scrambled, and as a result, the values of the timing reference signal SAV become different values even with a flat field video signal. Therefore, even when certain data are scrambled and thereby converted into data indicating a word synchronization signal of the 8 B/10 B code, these data indicating the word synchronization signal of the 8 B/10 B code do not continue. This leads to an advantage that a field video signal can be output in a suitable manner.

BRIEF DESCRIPTION OF THE DRAWINGS

FIG. 6 is a block diagram showing the configuration of an S/P-scramble-8 B/10 B unit.

FIGS. 7A and 7B are charts showing pathological patterns.

FIG. 8 is a diagram showing an undulation of a base line in an AC coupling transmission system.

FIG. 9 is a diagram showing the XYZ codes in timing reference signal SAV.

FIGS. 11A to 11C are charts showing an example of the format of basic stream.

FIG. 16 is a block diagram showing a portion of the circuit configuration of the CCU shown in FIG. 1 that relates to an embodiment of the invention.

FIG. 19 is a flowchart showing the outline of the processing in the CCU.

FIGS. 20A to 20C illustrate charts showing an example of the format of basic stream in related art.

DESCRIPTION OF THE PREFERRED EMBODIMENTS

Hereinbelow, preferred embodiments of the invention (hereinafter referred to as embodiments) will be described. The description will be made according to the following order.

1. First Embodiment (scramble control: an example of a data rewriting process to SAV)
2. Modified Examples

1. First Embodiment

An Example of the Transmission System

Figure 1:
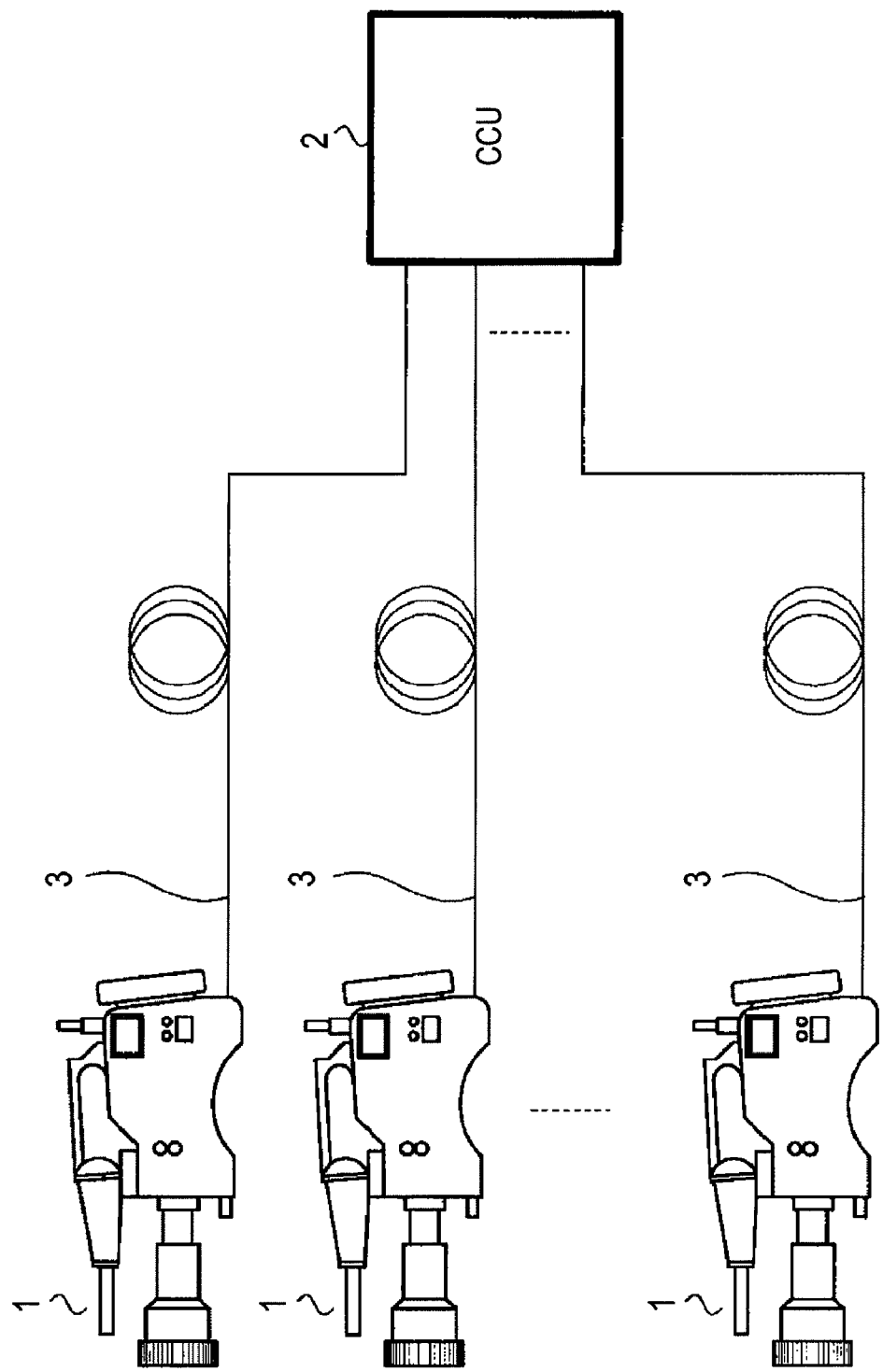
FIG. 1 is a diagram showing an overall configuration of a camera transmission system for a television broadcast station to which the invention is applied.

FIG. 1 is a diagram showing an overall configuration of a camera transmission system for a television broadcast station to which the invention is applied. This camera transmission system contains a plurality of broadcasting cameras 1 and a CCU (Camera Control Unit) 2. The broadcasting cameras 1 are connected to the CCU 2 by optical fiber cables 3.

Each of the broadcasting cameras 1 has the same configuration and is a camera that generates a 3840×2160/24P, 24/1.001P, 25P, 30P, 30/1.001P (hereinafter simply referred to as 24P, 25P, 30P)/4:4:4/12 bit signal. This signal is used as a 4 k×2 k signal (an ultra-high resolution signal of 4 k samples×2 k lines).

The CCU 2 is a unit for transmitting a video signal (return video) for controlling each of the broadcasting cameras 1, receiving a video signal from each of the broadcasting cameras 1, and causing a video image that is being shot by another broadcasting camera 1 on a monitor of each of the broadcasting cameras 1.

Example of the Internal Configuration of the Broadcasting Camera

Figure 2:
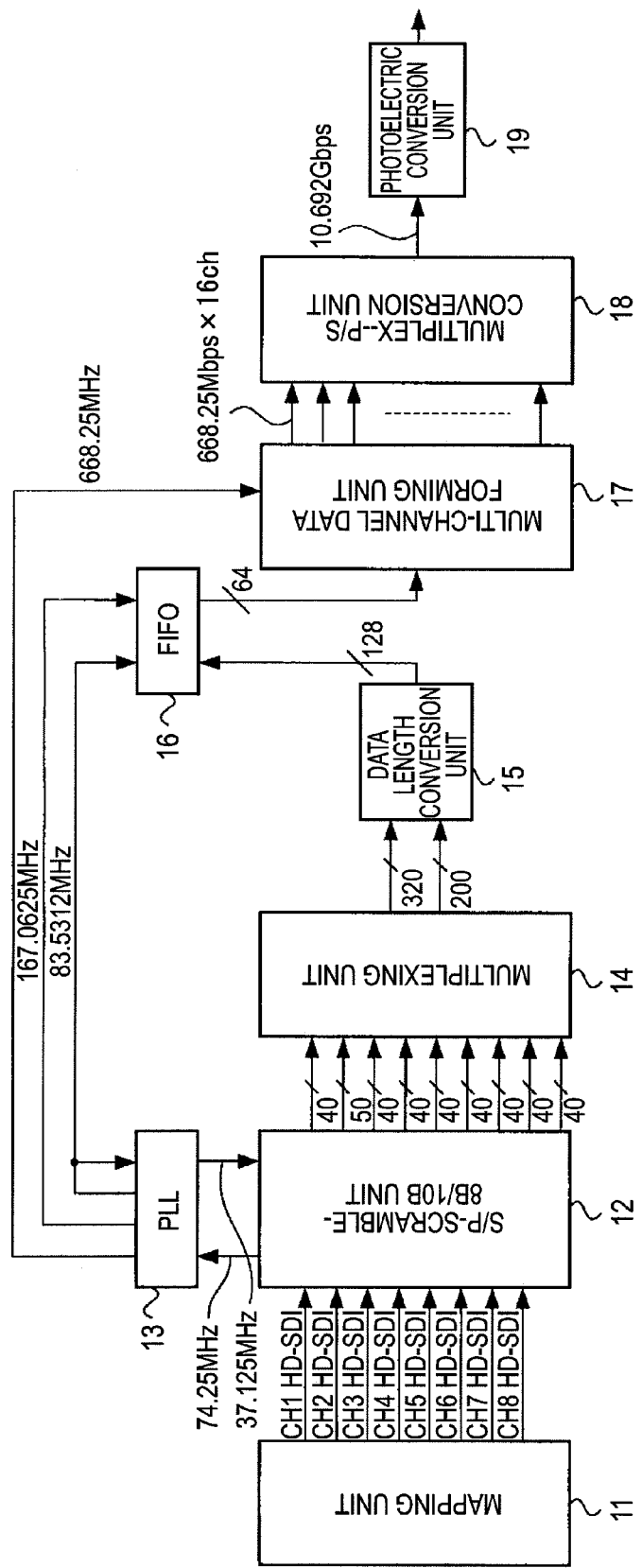
FIG. 2 is a block diagram showing a portion of the circuit configuration of the broadcasting camera of FIG. 1 that relates to an embodiment of the invention.

FIG. 2 is a block diagram showing a portion of the circuit configuration of the broadcasting camera 1 that relates to an embodiment of the invention. 3840×2160/24P, 25P, 30P/4:4:4/12 bit signals generated by an imaging unit and a video signal processing unit (not shown) within the broadcasting camera 1 are sent to a mapping unit 11.

Figure 3:
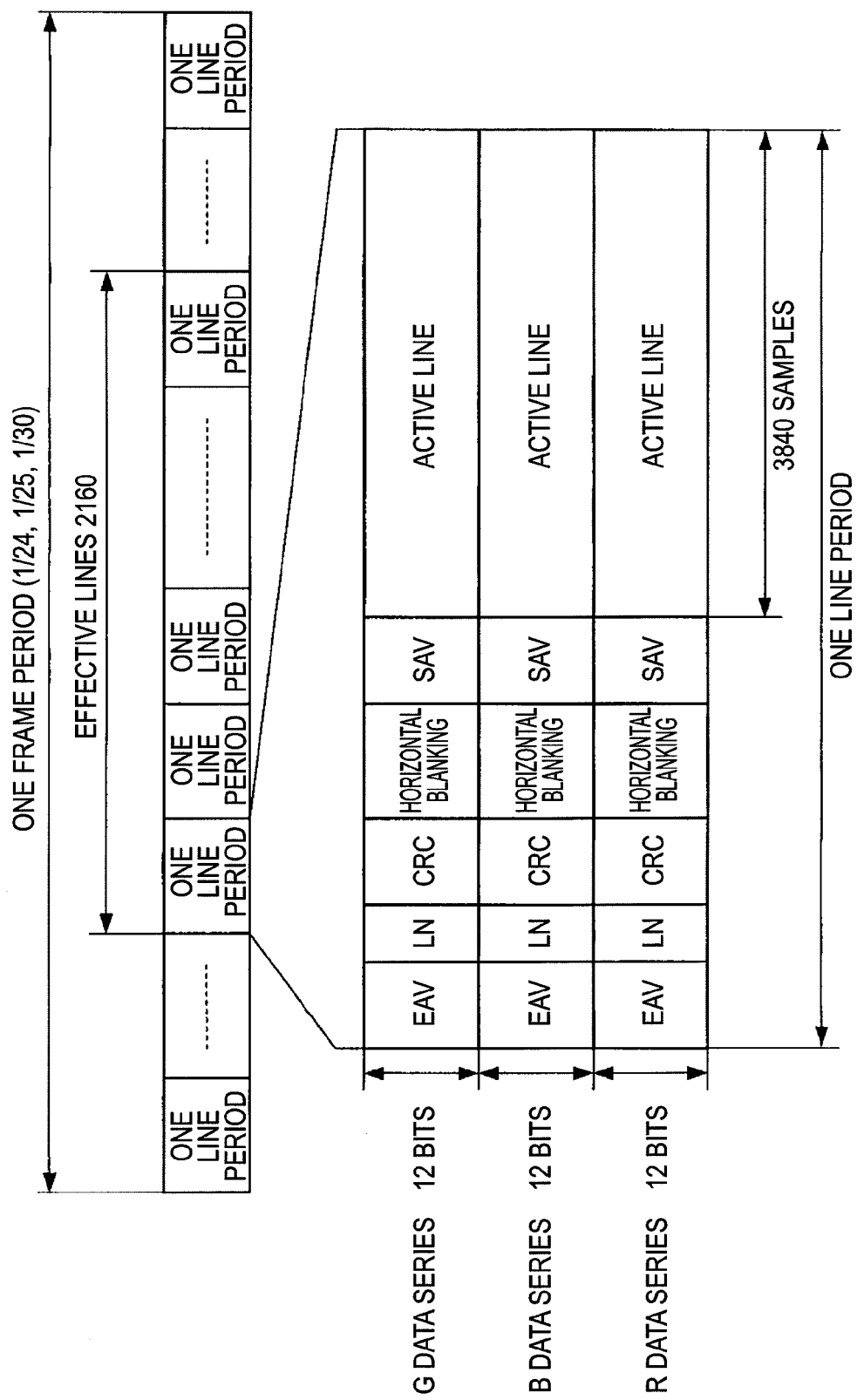
FIG. 3 is a chart showing a format of a 3840×2160/24P, 25P, 30P/4:4:4/12 bit signal.

FIG. 3 is a chart showing the format of a 3840×2160/24P, 25P, 30P/4:4:4/12 bit signal. The 3840×2160/24P, 25P, 30P/4:4:4/12 bit signal is a 36-bit width signal in which G data series, B data series, and R data series each with a word length of 12 bits are synchronized and arranged in parallel. One frame period is one of ¹⁄₂₄ seconds, ¹⁄₂₅ seconds, and ¹⁄₃₀ seconds. One frame period contains 2160 effective line periods.

Each effective line period contains a timing reference signal EAV (End of Active Video), a line number LN, and an error detection code CRC. It also contains a horizontal blanking period (a segment for ancillary data/undefined word data), a timing reference signal SAV (Start of Active Video), and an active line, which is a segment for video image data. The number of samples in the active line is 3840, and the active lines of G data series, B data series, R data series contain video image data of G, B, and R, respectively.

The mapping unit 11 shown in FIG. 2 is a circuit for mapping the 3840×2160/24P, 25P, 30P/4:4:4/12 bit signals to HD-SDI signals of 8 channels, CH1 to CH8, according to SMPTE 435M. CH1 to CH8 include Link A, which contain CH1, CH3, CH5, and CH7, and Link B, which contain CH2, CH4, CH6, and CH8. The 8 channel HD-SDI signal has a bit rate of 1.485 Gbps or a 1.485 Gbps/1.001 (hereinafter simply "1.485 Gbps").

Figure 4:
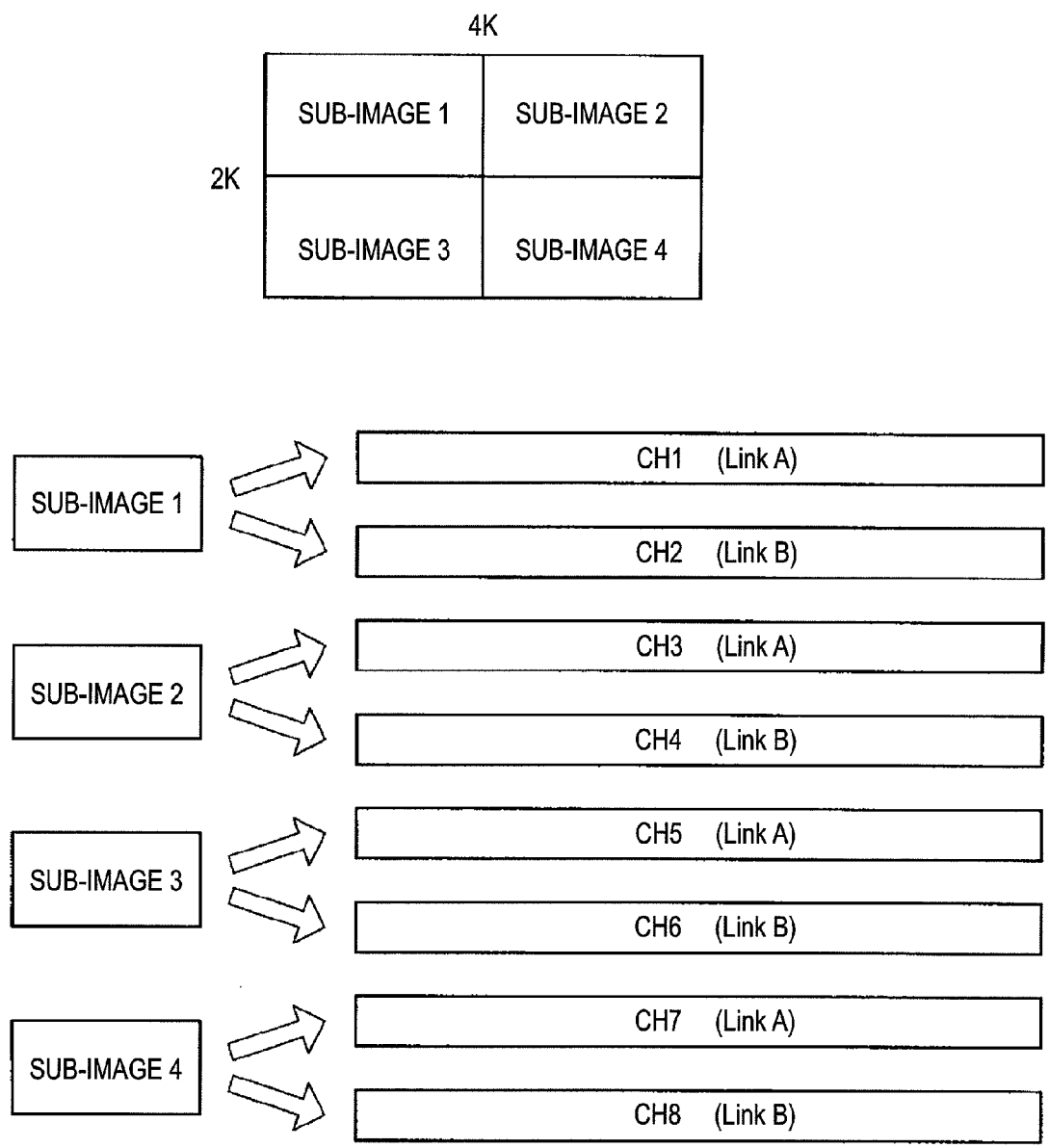
FIG. 4 is a chart showing the outline of the mapping method of a 4 k×2 k signal to an HD-SDI signal according to SMPTE 435M Part 1 5.4 Octa Link 1.5 Gbps Class.

SMPTE 435M is a standard of 10 G interface. This standard specifies that an HD-SDI signal with a plurality of channels is 8 B/10 B encoded in a unit of 2 samples (40 bits) and converted into 50 bits. It also defines that the data are multiplexed channel by channel and serially transmitted at a bit rate of 10.692 Gbps or 10.692 Gbps/1.001 (hereinafter simply "10.692 Gbps"). The method of mapping a 4 k×2 k signal to an HD-SDI signal is shown in FIG. 3 and FIG. 4 of SMPTE 435M, Part 1, 5.4 Octa Link 1.5 Gbps Class. FIG. 4 is a chart showing the outline of the mapping method. The data for 1 frame of 4 k×2 k signal are divided into four sub-images 1 to 4, which correspond to the top left, the top right, the bottom left, and the bottom right of a screen, respectively. CH1 (Link A) and CH2 (Link B), and CH3 (Link A) and CH4 (Link B) according to SMPTE 372M (Dual Link) are formed from the sub-images 1 and 2, respectively. CH5 (Link A) and CH6 (Link B), and CH7 (Link A) and CH8 (Link B) are likewise formed from the sub-images 3 and 4, respectively.

Figure 5A:
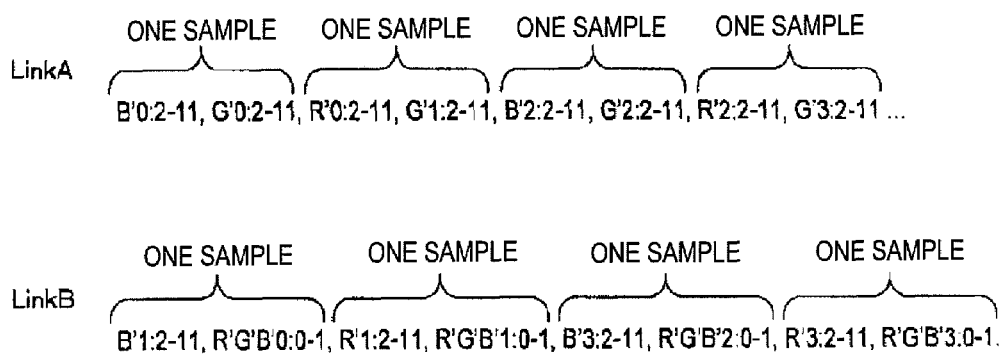
FIGS. 5A and 5B are charts showing the outline of the data structure of Link A and Link B according to SMPTE 372M.
Figure 5B:
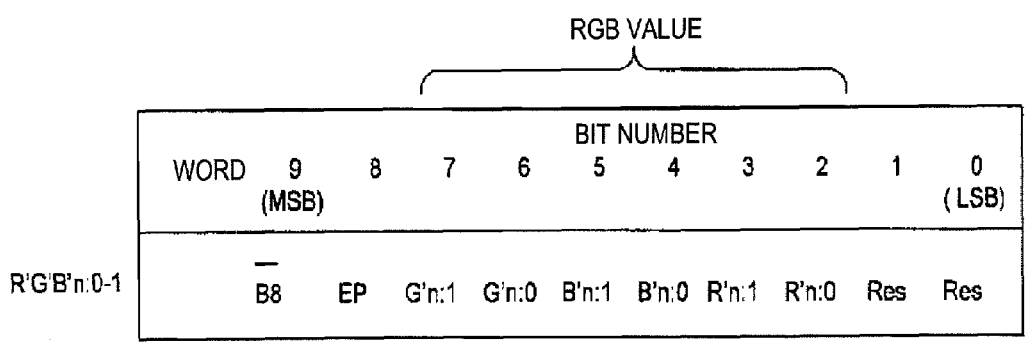

The data structure of Link A and Link B are shown in Table 2 and FIG. 6 of SMPTE 372M. FIGS. 5A and 5B are charts showing the outline thereof. In Link A, one sample contains 20 bits, and all the bits represent RGB values, as shown in FIG. 5A. In Link B also, one sample contains 20 bits, as shown in FIG. 5A. However, as shown in FIG. 5B, in the Ych of Link B, only 6 bits, bit numbers 2 to 7, among 10 bits of R'G'B'n: 0-1 represent RGB values. Therefore, the number of bits that represent RGB values in one sample is 16 bits.

The HD-SDI signal of CH1 to CH8 mapped by the mapping unit 11 in this way is sent to an S/P-scramble-8 B/10 B unit 12, as shown in FIG. 2.

Example of the Internal Configuration of the S/P-scramble-8 B/10 B Unit

FIG. 6 is a block diagram showing the configuration of the S/P-scramble-8 B/10 B unit 12. The S/P-scramble-8 B/10 B unit 12 has eight blocks 12-1 to 12-8, each corresponding to CH1 to CH8 one by one.

Among the blocks 12-1, 12-3, 12-5, 12-7 for CH1, CH3, CH5, and CH7, which are Link A, only the block 12-1 has a different configuration from those of the blocks 12-3, 12-5, and 12-7. On the other hand, the blocks 12-3, 12-5, and 12-7 have the same configuration (in the figure, the configuration of the block 12-3 is shown and the configurations of the blocks 12-5 and 12-7 are omitted). All the blocks 12-2, 12-4, 12-6, and 12-8 for CH2, CH4, CH6, and CH8, which are Link B, have the same configuration (in the figure, the configuration of the block 12-2 is shown, and the configurations of the blocks 12-4, 12-6, and 12-8 are omitted). It should be noted that the parts that perform the same process in the blocks are denoted by the same reference numerals.

First, the blocks 12-1, 12-3, 12-5, and 12-7 for Link A are described. In the blocks 12-1, 12-3, 12-5, and 12-7, input HD-SDI signals of CH1, CH3, CH5, and CH7 are sent to an S/P (serial/parallel) conversion unit 21. The S/P conversion unit 21 serial-to-parallel converts the HD-SDI signal parallel digital data with a 20-bit width at a bit rate of 74.25 Mbps or 74.25 Mbps/1.001 (hereinafter simply "74.25 Mbps"). Then, it extracts a 74.25 MHz clock.

The parallel digital data that have been serial-to-parallel converted by the S/P conversion unit 21 is sent to a TRS detection unit 22. The 74.25 MHz clock extracted by the S/P conversion unit 21 is sent to a FIFO memory 23 as a write clock. The 74.25 MHz clock extracted by the S/P conversion unit 21 in the block 12-1 is also sent to the PLL 13, shown in FIG. 2.

The TRS detection unit 22 detects timing reference signals SAV and EAV from the parallel digital video signal that is sent from the S/P conversion unit 21, and it establishes word synchronization based on the result of the detection.

The parallel digital data that have undergone the process of the TRS detection unit 22 are sent to the FIFO memory 23 and written into the FIFO memory 23 at the 74.25 MHz clock from the S/P conversion unit 21.

The PLL 13 shown in FIG. 2 sends a 37.125 MHz clock, which is obtained by frequency-dividing the 74.25 MHz clock from the S/P conversion unit 21 in the block 12-1 into ½, as a read clock to the FIFO memory 23 in each of the blocks 12-1 to 12-8. Then, it sends the clock to a FIFO memory 26 in each of the blocks 12-1 to 12-8 and a FIFO memory 27 in the block 12-1 as a write clock.

The PLL 13 sends an 83.5312 MHz clock, which is 9/8 times the frequency of the 74.25 MHz clock from the S/P conversion unit 21 in the block 12-1, as a read clock to the FIFO memory 26 in each the blocks 12-1 to 12-8. It also sends the clock to the FIFO memory 27 in the block 12-1 as a read clock. Then, it sends the clock as a write clock to a FIFO memory 16 shown in FIG. 2.

The PLL 13 also sends a 167.0625 MHz clock, which is 9/4 times the frequency of the 74.25 MHz clock from the S/P conversion unit 21 in the block 12-1, as a read clock to the FIFO memory 16 shown in FIG. 2.

The PLL 13 also sends a 668.25 MHz clock, which is 9 times the frequency of the 74.25 MHz clock from the S/P conversion unit 21 in the block 12-1, as a read clock to a multi-channel data forming unit 17 shown in FIG. 2.

As shown in FIG. 6, 20-bit width parallel digital data that are written with the 74.25 MHz clock from the S/P conversion unit 21 are read out from the FIFO memory 23. At this time, the data are read out as 40-bit width parallel digital data in the unit of 2 samples, using the 37.125 MHz clock from the PLL 13 shown in FIG. 2, and sent to a scrambler 24. In the block 12-1, the 40-bit width parallel digital data read out from the FIFO memory 23 are also sent to an 8 B/10 B encoder 25.

The scrambler 24 is a self-synchronizing type scrambler. The self-synchronizing scrambling scheme is a scrambling scheme that is employed in SMPTE 292M. In the scrambler 24, the transmission side regards the input serial signal as a polynomial and sequentially divides the input serial signal by a 9th-order primitive polynomial:

$$X^9+X^4+1.$$

The result of the division, the quotient, is transmitted to statistically set the mark rate (a proportion of 1s and 0s) of the transmitted data to ½ on average. This scrambling also has the significance of signal encryption by the primitive polynomial. The quotient is further divided by X+1 to produce polarity-free data (i.e., the data and the inverted data thereof have the same information), and then, the data are transmitted. The receiver reproduces the original serial signal by multiplying the received serial signal by X+1 and further multiplying the signal by the primitive polynomial $X^9+X^4+1$ (descrambling).

First, the scrambler 24 rewrites the timing reference signal SAV specified as 000h, 000h, 000h, 000h, among the data of the horizontal lines in Link A that have been serial-to-parallel converted by the serial-to-parallel conversion unit, into a predetermined value. In this embodiment, the timing reference signal SAV specified as 000h, 000h, 000h, 000h is rewritten into a line number: LN0, LN0, LN1, LN1, following the timing reference signal EAV contained in Link A, in that order. This process will be described later with reference to FIGS. 11A to 11C.

Then, the scrambler 24 does not scramble all the data in the horizontal lines, but scrambles only the data of the timing reference signal SAV, the active line, the timing reference signal EAV, the line number LN, and the error detection code CRC. On the other hand, it does not scramble the data of the horizontal blanking period. Then, encoding is performed while setting all the register values in the scrambler to 0 immediately before the timing reference signal SAV, and up to 10 bits of data that follow the error detection code CRC are output.

The reason why such a process is performed in the scrambler 24 is as follows. In the self-synchronizing scrambling scheme in related art, all the data of the horizontal lines are transmitted continuously. However, in the embodiment of the invention, the data of the horizontal blanking periods to which self-synchronizing scrambling is applied are not transmitted. A possible method for that purpose is as follows; all the data of the horizontal lines including the horizontal blanking periods are scrambled, but only the data of the horizontal blanking periods are not transmitted. In this method, however, the continuity of the data is not retained between the transmission-side scrambler and the reception-side descrambler. Consequently, carrying calculation error occurs in the last several bits of the CRC when reproducing the data in the reception-side descrambler, and the error detection code CRC cannot be reproduced accurately. Another method is that the clock of the scrambler is stopped in the horizontal blanking period, in which data are not transmitted, so that the CRC can be reproduced accurately. Employing this method, however, causes such a problem that the next timing reference signal SAV is required when calculating the CRC, making timing control difficult.

In view of this, only the data of the timing reference signal SAV, the active line, the timing reference signal EAV, the line number LN, and the error detection code CRC are scrambled. In addition, encoding is performed while setting all the register values in the scrambler 24 to 0 immediately before the timing reference signal SAV. Then, at least up to several bits (e.g., 10 bits) of data following the error detection code CRC are output.

In this way, the reception-side device can start decoding while setting all the register values in the descrambler to 0 immediately before the timing reference signal SAV. In addition, by descrambling at least several bits of data following the error detection code CRC as well, accurate calculation can be performed taking into consideration carrying of the descrambler, which is a multiplier circuit, to reproduce the original data.

Furthermore, it was found by calculation that no pathological pattern occurs in the scrambled data when all the register values in the scrambler are set to 0 immediately before the timing reference signal SAV. The pathological pattern refers to the occurrence of a pattern signal in which 'H' or 'L' continues for a predetermined number of bits over one horizontal line on a serial transmission path when self-synchronizing scrambling is applied to the data. For example, FIG. 7A shows a signal with a pattern having 1 bit of 'H' followed by 19 bits of 'L' (or an inverted pattern thereof). FIG. 7B shows a signal with a pattern having 20 bits of consecutive 'H' followed by 20 bits of consecutive 'L' (or an inverted pattern thereof).

The pattern shown in FIG. 7A or the inverted pattern thereof is a pattern with large dc components. In order to realize a high-speed transmission rate such as 10 Gbps, it is commonplace to use an AC coupling transmission system. However, when large dc components exist, the AC coupling transmission system causes a base line undulation such as shown in FIG. 8, and therefore, it becomes necessary to reproduce the dc components in the reception-side device.

The pattern shown in FIG. 7B and the inverted pattern thereof have a small number of transition from 0 to 1 and transition from 1 to 0, so it is difficult for the reception-side device to reproduce a clock from the serial signal.

In contrast, it was found by calculation that when all the register values in the scrambler are set to 0 immediately before the timing reference signal SAV, no such pathological pattern occurs. Therefore, it can be said that the resulting signal is a desirable signal as a transmission code.

As shown in FIG. 9, the lower 2 bits of XYZ (i.e., the word for discriminating between the first field and the second field in the same frame or discriminating between SAV and EAV), which is the last word in the timing reference signal SAV, are (0, 0). However, for example, the scrambler 24 in the block 12-1 scrambles the data while keeping these lower 2 bits to be (0, 0). Next, the scrambler 24 in the block 12-3 scrambles the data after rewriting these lower 2 bits to be (0, 1). Next, the scrambler 24 in the block 12-5 scrambles the data after rewriting these lower 2 bits to be (1, 0). Then, the scrambler 24 in the block 12-7 scrambles the data after rewriting these lower 2 bits to be (1, 1). In this way, scrambling is performed while varying the values of these lower 2 bits channel by channel for each of the channels CH1, CH3, CH5, and CH7.

The reason why such a process is performed is as follows. Assume the case where the 3840×2160/24P, 25P, 30P/4:4:4/12 bit signal is a flat signal (i.e., the RGB values are approximately the same over the entire screen). In this case, it is undesirable that the data values become uniform between CH1, CH3, CH5, and CH7 and CH2, CH4, CH6, and CH8, because EMI (electromagnetic interference) or the like occurs. In contrast, assume a case in which scrambling is performed while varying the values of the lower 2 bits of the XYZ in the SAV channel by channel for each of the channels CH1, CH3, CH5, and CH7. In this case, as for the scrambled data, the results obtained by dividing (0, 1), (1, 0), and (1, 1) by the generator polynomial are transmitted, in addition to the data in which the lower 2 bits of the XYZ are set to (0, 0). As a result, it becomes possible to avoid data uniformity.

Moreover, even if the values of the lower 2 bits of the XYZ are varied channel by channel for each channel, it was found by calculation that the pathological patterns do not occur when all the register values in the scrambler are set to 0 immediately before the timing reference signal SAV as described above.

In this way, the 40-bit width parallel digital data scrambled by the scrambler 24 are written into the FIFO memory 26 using the 37.125 MHz clock from the PLL 13 shown in FIG. 2. Thereafter, the data are read out from the FIFO memory 26 using the 83.5312 MHz clock from the PLL 13 while retaining the 40-bit width, and sent to a multiplexing unit 14 shown in FIG. 2.

The 8 B/10 B encoder 25 in the block 12-1 subjects only the data of the horizontal blanking period to 8-bit/10-bit encoding, among the 40-bit width parallel digital data read out from the FIFO memory 23.

The 50-bit width parallel digital data that have been subjected to 8-bit/10-bit encoding by the 8 B/10 B encoder 25 are written into the FIFO memory 27 using the 37.125 MHz clock from the PLL 13 shown in FIG. 2. Thereafter, the data are read out from the FIFO memory 27 using the 83.5312 MHz clock from the PLL 13 while retaining the 50-bit width, and sent to the multiplexing unit 14 shown in FIG. 2.

It should be noted that the data of the horizontal blanking period are sent to the multiplexing unit 14 only from the block 12-1 (i.e., only for the CH1). The data of the horizontal blanking period are not sent from the blocks 12-3, 12-5, and 12-7 (i.e., for the CH3, the CH5, and the CH7) to the multiplexing unit 14. This is due to the constraint on the data amount.

Next, the blocks 12-2, 12-4, 12-6, and 12-8 for Link B will be described. In these blocks, the input HD-SDI signals of CH2, CH4, CH6, and CH8 are subjected to the same processes as those for the blocks 12-1, 12-3, 12-5, and 12-7 by the S/P conversion unit 21 and the TRS detection unit 22 and are thereafter sent to an extracting unit 28.

The extracting unit 28 is a circuit for extracting RGB bits (16 bits that represent RGB values among the 20 bits of one sample of Link B shown in FIG. 5A) from the data of each horizontal line of Link B. Here, the extracting unit 28 extracts RGB bits only from the data of the timing reference signal SAV, the active line, the timing reference signal EAV, the line number LN, and the error detection code CRC.

The 16-bit width parallel digital data extracted by the extracting unit 28 are written into the FIFO memory 23 using the 74.25 MHz clock from the S/P conversion unit 21. Thereafter, the data are read out as 32-bit width parallel digital data in the unit of 2 samples, using the 37.125 MHz clock from the PLL 13 shown in FIG. 2, and are sent to a K28.5 inserting unit 29.

The K28.5 inserting unit 29 inserts two 8-bit word data into the head portion of the timing reference signal SAV or EAV. These 8-bit word data are ones that are converted into 10-bit word data that are not used as the word data representing video signals when subjected to 8-bit/10-bit encoding (ones that are called by a code name K28.5).

The 32-bit width parallel digital data that have undergone the process of the K28.5 inserting unit 29 are sent to an 8 B/10 B encoder 30. The 8 B/10 B encoder 30 subjects these 32-bit width parallel digital data to 8-bit/10-bit encoding and outputs the resulting data.

The reason why the 32-bit width parallel digital data in the unit of 2 samples are subjected to 8-bit/10-bit encoding by the 8 B/10 B encoder 30 is as follows. The purpose is that the data need to be compatible with the upper 40 bits of the 50-bit Content ID in SMPTE 435M, which is a 10 G interface standard.

The 40-bit width parallel digital data subjected to 8-bit/10-bit encoding by the 8 B/10 B encoder 30 are written into the FIFO memory 26 using the 37.125 MHz clock from the PLL 13 shown in FIG. 2. Thereafter, the data are read out from the FIFO memory 26 using the 83.5312 MHz clock from the PLL 13 while retaining the 40-bit width, and sent to the multiplexing unit 14 shown in FIG. 2.

Figure 10A:
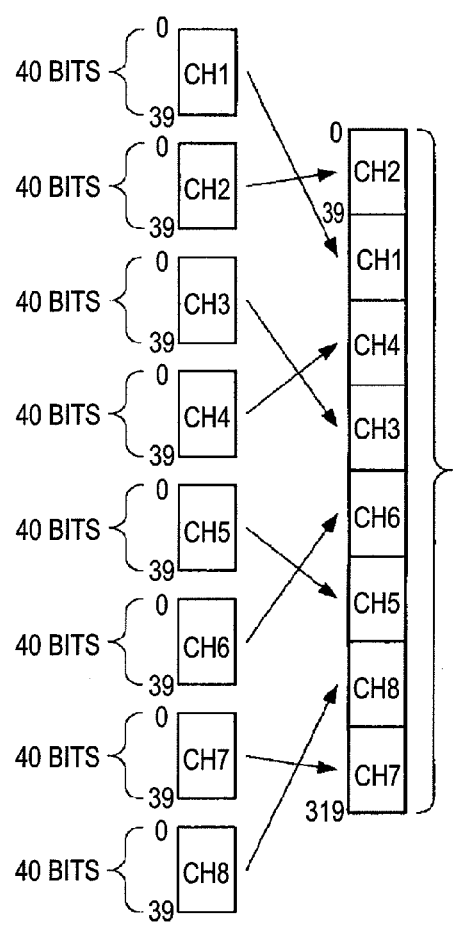
FIGS. 10A and 10B are diagrams showing the multiplex state of the multiplexing unit.

The multiplexing unit 14 shown in FIG. 2 sequentially multiplexes the 40-bit width parallel digital data of each of the CH1 to the CH8, which have been read out from the FIFO memory 26 in each of the blocks 12-1 to 12-8 in the S/P-scramble-8 B/10 B unit 12, into 320-bit width data in the unit of 40 bits. This is shown in FIG. 10A. The 40-bit width parallel digital data include only the data of the timing reference signal SAV, the active line, the timing reference signal EAV, the line number LN, and the error detection code CRC. The order in which the data are multiplexed to be a 320-bit width is CH2, CH1, CH4, CH3, CH6, CH5, CH8, and CH7, respectively. CH2, CH4, CH6, and CH8 are the channels that are subjected to 8-bit/10-bit encoding. CH1, CH3, CH5, and CH7 are the channels to which self-synchronizing scrambling is applied.

Thus, the data to which self-synchronizing scrambling is applied are sandwiched by every 40 bits of the data subjected to 8-bit/10-bit encoding. Thereby, pathological patterns can be prevented from occurring. Thus, it is possible to eliminate the fluctuation in the mark rate (a proportion of 0s and 1s) resulting from the scrambling scheme and the instability in the transitions of 0-1 and 1-0.

Figure 10B:
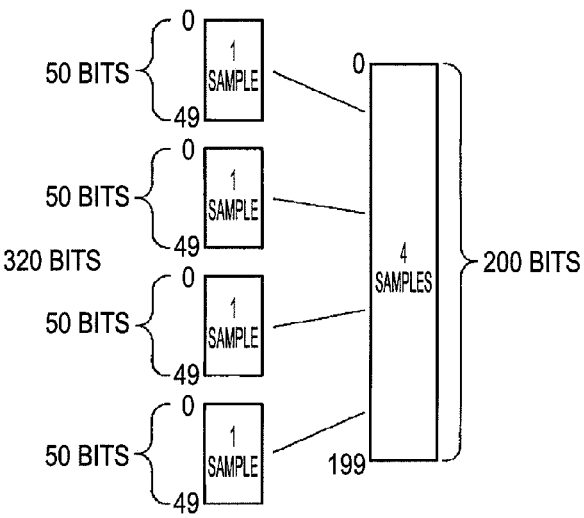

In addition, the multiplexing unit 14 multiplexes 4 samples of the 50-bit width parallel digital data of only the horizontal blanking period of the CH1 read out from the FIFO memory 27 in the block 12-1 in the S/P-scramble-8 B/10 B unit 12 to make them have a 200-bit width. This is shown in FIG. 10B.

The 320-bit width parallel digital data and the 200-bit width parallel digital data multiplexed by the multiplexing unit 14 are sent to a data length conversion unit 15. The data length conversion unit 15 have shift registers. Then, 256-bit width parallel digital data are formed using the data obtained by converting the 320-bit width parallel digital data into 256-bit width data and the data obtained by converting the 200-bit width parallel digital data into 256-bit width data. Then, the 256-bit width parallel digital data are further converted into 128-bit width data.

FIGS. 11A to 11C are charts showing an example of transmission of the basic stream according to the present embodiment.

FIG. 11A shows an example of the data structure in the case of transmitting basic stream CHs 1, 3, 5, and 7.

The following process is performed in order to improve the stability against the flat field. That is, before performing scrambling, the scrambler 24 rewrites (000h, 000h, 000h, 000h) of the SAV (3FFh, 3FFh, 000h, 000h, 000h, 000h, XYZh, XYZh) in CHs 1, 3, 5, and 7 into predetermined values. In this example, the scrambler 24 carries out the process of rewriting the contents of the line number (LN0, LN0, LN1, LN1) contained in a field 51 into the contents of the SAV (000h, 000h, 000h, 000h) contained in a field 52. Specifically, scrambling is applied after rewriting the data into (LN0, LN0, LN1, LN1) following the EAV of the same line as that in which the SAV of the CHs 1, 3, 5, and 7 is multiplexed. By this process, the basic stream CHs 1, 3, 5, and 7 are converted into video signals each containing SAV, active video, and EAV. At this time, the lower 2 bits of CXYZh are rewritten into (0, 0), (0, 1), (1, 0), and (1, 1) in the CHs 1, 3, 5, and 7, respectively.

FIG. 11B shows an example of the data structure in the case of transmitting basic stream CHs 2, 4, 6, and 8.

The basic stream CHs 2, 4, 6, and 8 are converted into HD-SDI format signals each containing SAV, active video, and EAV. Note that these HD-SDI format signals are subjected to 8 B/10 B conversion.

FIG. 11C shows an example of a 10-bit 8-word data structure.

A field 53 shown in FIG. 11A and a field 54 shown in FIG. 11B are inserted into the 10-bit 8-word data.

In this way, in the CHs 1, 3, 5, and 7, only the timing reference signal SAV, the timing reference signal EAV, and the active video are scrambled, and the data are multiplexed. At this time, encoding is performed while setting all the register values in the scrambler to 0 immediately before the SAV, and up to 10 bits of data following the timing reference signal EAV, the line number LN, and the error detection code CRC are sent. On the other hand, a later-described descrambler 41 on the reception side starts decoding while setting all the register values to 0 immediately before the SAV. It also subjects extra 10 bits of data that have been sent to the descrambling process. Thereby, the carrying of the descrambler, which is a multiplier circuit, can be calculated, and the original data can be reproduced accurately.

In addition, in the case where the 4 k screen is a flat field, the data values become the same between the CHs 1, 3, 5, and 7 and the CH2, 4, 6, and 8. This is undesirable because EMI or the like occurs. In view of this, at the time of scrambling, 000h, 000h, 000h, and 000h in the SAV are rewritten into CLN0, YLN0, CLN1, and YLN1 following the EAV in the same line of the input HD-SDI. Then, the lower 2 bits of XYZ (reserve 0) are changed channel by channel for each channel, and scrambling is performed. As a result, data uniformity can be avoided. The lower 2 bits of XYZ may be processed so that they are put back to the original 00 at the reception side.

Figure 12:
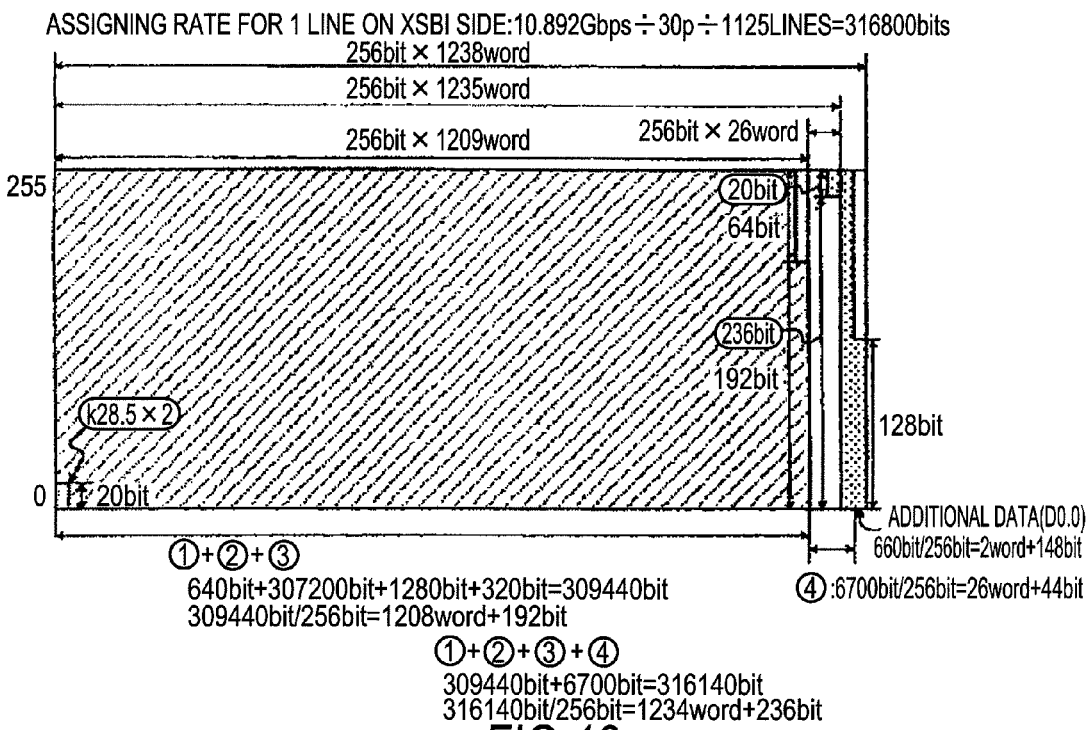
FIG. 12 is a chart showing the structure of the data formed by a data length conversion unit.
Figure 13:
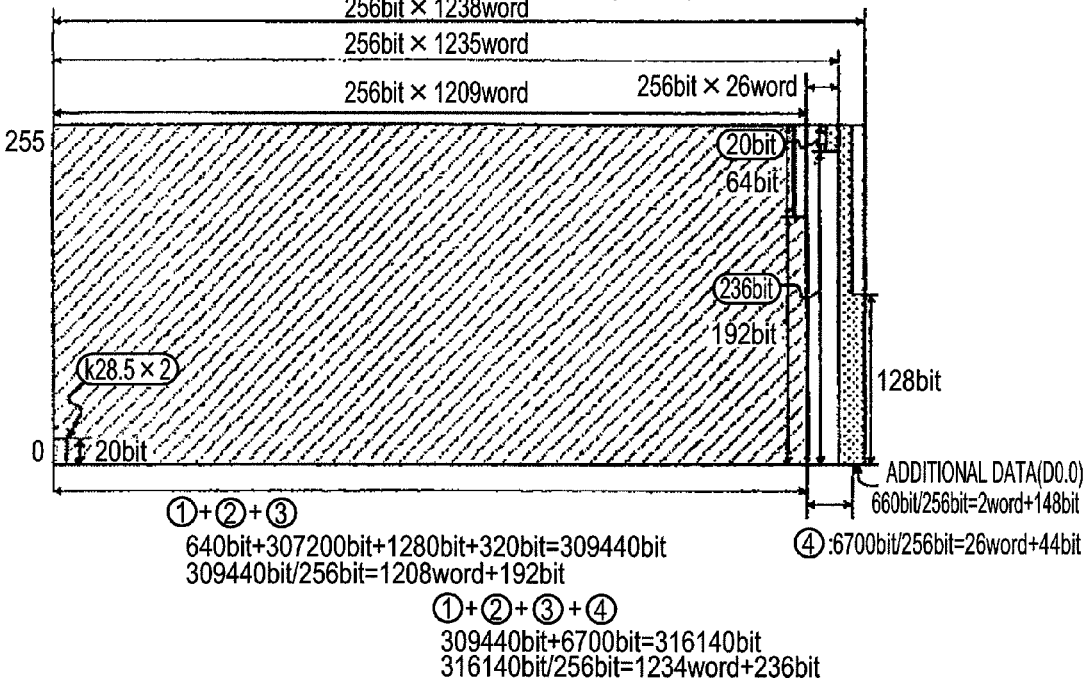
FIG. 13 is a chart showing the structure of the data formed by a data length conversion unit.
Figure 14:
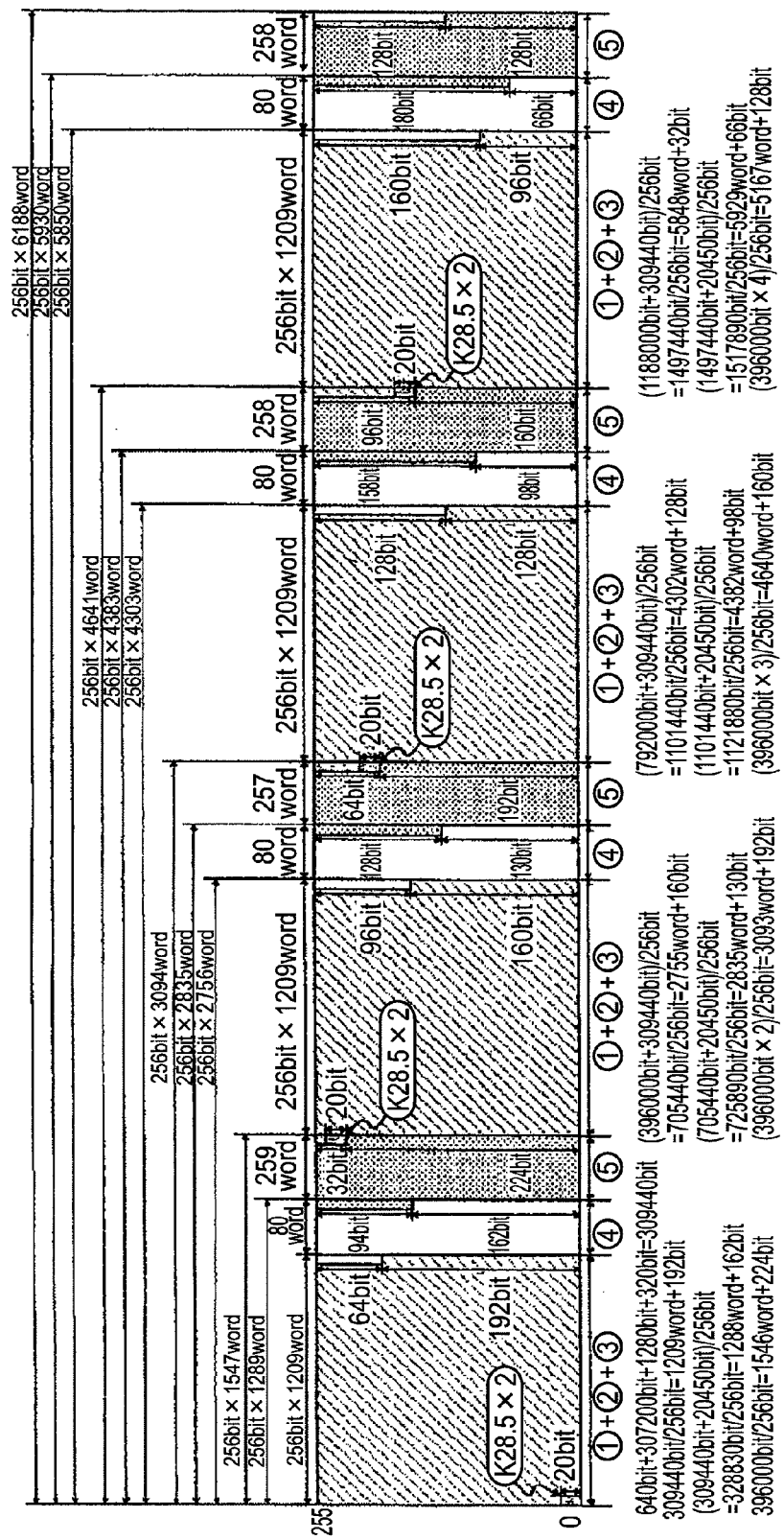
FIG. 14 is a chart showing the structure of the data formed by a data length conversion unit.

FIGS. 12 to 14 are charts each showing a structure of 256-bit width parallel digital data formed by the data length conversion unit 15.

FIG. 12 shows a data structure for one line in the case of 30P.

FIG. 13 shows a data structure for one line in the case of 25P.

FIG. 14 shows a data structure for four lines in the case of 24P.

It should be noted that in the case of 24P, the number of bits of the last word becomes 128 bits in a four line cycle, so the data for four lines are depicted.

In SMPTE 435M, the frame rate and the line number are made the same as those for the HD-SDI signal of CH1. The S/P-scramble-8 B/10 B unit 12 uses both scrambling and 8 B/10 B encoding, but scrambling (one that is employed in SMPTE 292M) is applied to the CH1. Accordingly, the data structures shown in FIGS. 12 to 14 are basically the same as that of the HD-SDI signal.

As shown in FIGS. 12 to 14, the data for one line includes the following three regions.

The region indicated by slanted lines: the region for the data of the timing reference signal SAV, the active line, the timing reference signal EAV, the line number LN, and the error detection code CRC of CH1 to CH8, multiplexed in the unit of 40 bits in the order: CH2, CH1, CH4, CH3, CH6, CH5, CH8, and CH7.

The white region: the region for the data of the horizontal blanking period, each with 50 bits, of CH1 subjected to 8 B/10 B encoding.

Dotted region: the region for additional data for adjusting the data amount.

As shown in FIG. 2, the parallel digital data converted into 128-bit width data by the data length conversion unit 15 are sent to the FIFO memory 16 and written into the FIFO memory 16 using the 83.5312 MHz clock from the PLL 13.

The 128-bit width parallel digital data written into the FIFO memory 16 are read out from the FIFO memory 16 as 64-bit width parallel digital data, using the 167.0625 MHz clock from the PLL 13 shown in FIG. 2. Thereafter, the data are sent to the multi-channel data forming unit 17.

The multi-channel data forming unit 17 is, for example, an XSBI (Ten gigabit Sixteen Bit Interface: 16-bit interface used in the 10 gigabit Ethernet (registered trademark) system). From the 64-bit width parallel digital data provided from the FIFO memory 16, the multi-channel data forming unit 17 forms serial digital data for 16 channels each having a bit rate of 668.25 Mbps. At this time, the multi-channel data forming unit 17 uses the 668.25 MHz clock from the PLL 13. The 16-channel serial digital data formed by the multi-channel data forming unit 17 are sent to a multiplex-P/S conversion unit 18.

The multiplex-P/S conversion unit 18 multiplexes the 16-channel serial digital data from the multi-channel data forming unit 17, and it parallel-to-serial converts the multiplexed parallel digital data. Thereby, serial digital data of 668.25 Mbps×16=10.692 Gbps are generated.

Figure 15A:
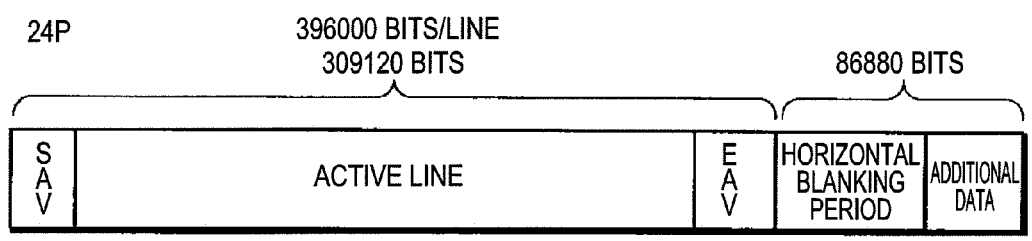
FIGS. 15A to 15C are charts showing the structure of one line of 10.692 Gbps serial digital data generated by a multiplex-P/S conversion unit.
Figure 15B:
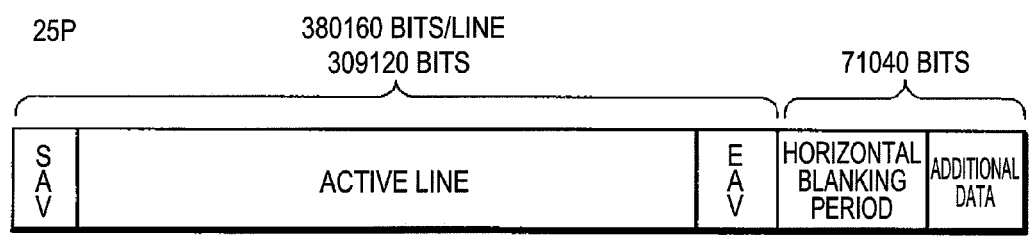
Figure 15C:
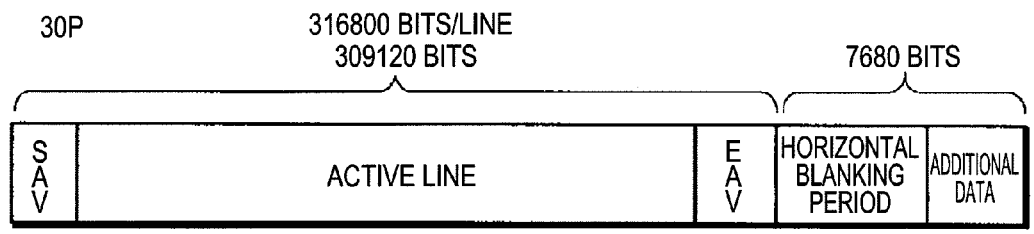

FIGS. 15A to 15C are charts showing the structure of the data for one line of the 10.692 Gbps serial digital data. FIG. 15A shows the structure in the case of 24P, FIG. 15B shows the structure in the case of 25P, and FIG. 15C shows the structure in the case of 30P. In these figures, the data including the line number LN and the error detection code CRC are represented as SAV, active line, and EAV. Also, the data including the region for additional data, shown in FIGS. 12 to 14, are represented as the horizontal blanking period.

The number of bits for one line in each of the cases of 24P, 25P, and 30P can be obtained by the following equations, respectively.

10.692 Gbps÷24 frames/second÷1125 lines/frame=396000 bits 10.692 Gbps÷25 frames/second÷1125 lines/frame=380160 bits 10.692 Gbps÷30 frames/second÷1125 lines/frame=316800 bits The number of bits of the timing reference signal SAV, the active line, the timing reference signal EAV, the line number LN, and the error detection code CRC can be obtained by the following equation.

(1920$T$+12$T$)×36 bits×4 ch×40/36=309120 bits

The number of bits of the horizontal blanking period in each of the cases of 24P, 25P, and 30P can be obtained by the following equations, respectively.

In the case of 24$P$: 396000 bits−309120 bits=86880 bits (2750$T$−1920$T$−12$T$(SAV+EAV+LN+CRC))×20 bits× 10/8=20450 bits 86880 bits>20450 bits     (1)

In the case of 25$P$: 380160 bits−309120 bits=71040 bits (2640$T$−1920$T$−12$T$(SAV+EAV+LN+CRC))×20 bits× 10/8=17700 bits 71040 bits>17700 bits     (2)

In the case of 30$P$: 316800 bits−309120 bits=7680 bits (22$T$−1920$T$−12$T$(SAV+EAV+LN+CRC))×20 bits× 10/8=6700 bits 7680 bits>6700 bits     (3)

As will be appreciated from the foregoing equations:

In the case of 24P, the number of bits of the horizontal blanking period according to SMPTE 435M, 86880 bits, is greater than 20450 bits.

In the case of 25P, the number of bits of the horizontal blanking period according to SMPTE 435M, 71040 bits, is greater than 17700 bits.

In the case of 30P, the number of bits of the horizontal blanking period according to SMPTE 435M, 7680 bits, is greater than 6700 bits.

Here, 20450 bits in the case of 24P is the number of bits of {the data of horizontal blanking period−(the data of timing reference signal SAV, the timing reference signal EAV, the line number LN, and the error detection code CRC)} in CH1. Also, 17700 bits in the case of 25P and 6700 bits in the case of 30P are likewise.

For this reason, it is possible to multiplex the data of the horizontal blanking period of CH1.

As shown in FIG. 2, serial digital data with a bit rate of 10.692 Gbps generated by the multiplex-P/S conversion unit 18 are sent to a photoelectric conversion unit 19. Then, the serial digital data with a bit rate of 10.692 Gbps that are converted into optical signals by the photoelectric conversion unit 19 are transmitted from the broadcasting cameras 1 to the CCU 2 via the optical fiber cables 3 shown in FIG. 1.

Example of the Internal Configuration of the CCU

FIG. 16 is a block diagram showing a portion of the circuit configuration of the CCU 2 that relates to an embodiment of the invention. The CCU 2 is provided with a plurality of circuits as shown in FIG. 16 each corresponding to each of the broadcasting cameras 1 one by one.

The serial digital data with a bit rate of 10.692 Gbps that have been transmitted from the broadcasting camera 1 via the optical fiber cable 3 are converted into electric signals by a photoelectric conversion unit 31. Thereafter, the electric signals are sent to an S/P conversion and multi-channel data forming unit 32. The S/P conversion and multi-channel data forming unit 32 may be, for example, the previously-mentioned XSBI.

The S/P conversion and multi-channel data forming unit 32 serial-to-parallel converts the serial digital data with a bit rate of 10.692 Gbps. Then, serial digital data for 16 channels each with a bit rate of 668.25 Mbps are formed from the serial-to-parallel converted parallel digital data. Then, a 668.25 MHz clock is extracted.

The 16-channel parallel digital data formed by the S/P conversion and multi-channel data forming unit 32 are sent to a multiplexing unit 33. In addition, the 668.25 MHz clock extracted by the S/P conversion and multi-channel data forming unit 32 is sent to a PLL 34.

The multiplexing unit 33 multiplexes the 16-channel serial digital data from the S/P conversion and multi-channel data forming unit 32 and sends 64-bit width parallel digital data to a FIFO memory 35.

The PLL 34 sends a 167.0625 MHz clock, which is obtained by frequency-dividing the 668.25 MHz clock from the S/P conversion and multi-channel data forming unit 32 into ¼, as a write clock to the FIFO memory 35.

The PLL 34 also sends an 83.5312 MHz clock, which is obtained by frequency-dividing the 668.25 MHz clock from the S/P conversion and multi-channel data forming unit 32 into ⅛, as a read clock to the FIFO memory 35. Then, it sends the clock as a write clock to a FIFO memory 44 in a later-described descramble-8 B/10 B-P/S unit 38.

The PLL 34 also sends a 37.125 MHz clock, which is obtained by frequency-dividing the 668.25 MHz clock from the S/P conversion and multi-channel data forming unit 32 into ¹⁄₁₈, as a read clock to the FIFO memory 44 in the descramble-8 B/10 B-P/S unit 38. Then, it sends the clock as a write clock to a FIFO memory 45 in the descramble-8 B/10 B-P/S unit 38.

The PLL 34 also sends a 74.25 MHz clock, which is obtained by frequency-dividing the 668.25 MHz clock from the S/P conversion and multi-channel data forming unit 32 into ⅑, as a read clock to the FIFO memory 45 in the descramble-8 B/10 B-P/S unit 38.

The 64-bit width parallel digital data from the multiplexing unit 33 are written into the FIFO memory 35, using the 167.0625 MHz clock from the PLL 34. The parallel digital data written into the FIFO memory 35 are read out as 128-bit width parallel digital data, using the 83.5312 MHz clock from the PLL 34, and sent to a data length conversion unit 36.

The data length conversion unit 36 has shift registers and converts the 128-bit width parallel digital data into 256-bit width data (the data having the structure shown in FIGS. 12 to 14). Next, by detecting the K28.5 inserted in the timing reference signal SAV and EAV, the line periods are identified. Next, the data of the timing reference signal SAV, the active line, the timing reference signal EAV, the line number LN, and the error detection code CRC are converted to 320-bit width data. Then, the data of the horizontal blanking period (the data of the horizontal blanking period in CH1 that have been subjected to 8 B/10 B encoding as described above) are converted into 200-bit width data. The additional data shown in FIGS. 12 to 14 are discarded.

The 320-bit width parallel digital data and the 200-bit width parallel digital data whose data lengths are converted by the data length conversion unit 36 are sent to a separating unit 37.

The separating unit 37 separates the 320-bit width parallel digital data sent from the data length conversion unit 36 into the data of the CH1 to the CH8 each with 40 bits (see FIG. 10A), which are the data before being multiplexed by the multiplexing unit 14 in the broadcasting camera 1 (FIG. 2). The 320-bit width parallel digital data are the data of the timing reference signal SAV, the active line, the timing reference signal EAV, the line number LN, and the error detection code CRC. Then, the 40-bit width parallel digital data of each of CH1 to CH8 are sent to the descramble-8 B/10 B-P/S unit 38.

The separating unit 37 also separates the 200-bit width parallel digital data sent from the data length conversion unit 36 into the data each with 50 bits, which are the data before being multiplexed by the multiplexing unit 14 (see FIG. 10B). The 200-bit width parallel digital data are the data of the horizontal blanking period of CH1 that are subjected to 8 B/10 B encoding. Then, the 50-bit width parallel digital data are sent to the descramble-8 B/10 B-P/S unit 38.

Example of the Internal Configuration of the Descramble-8 B/10 B-P/Unit

Figure 17:
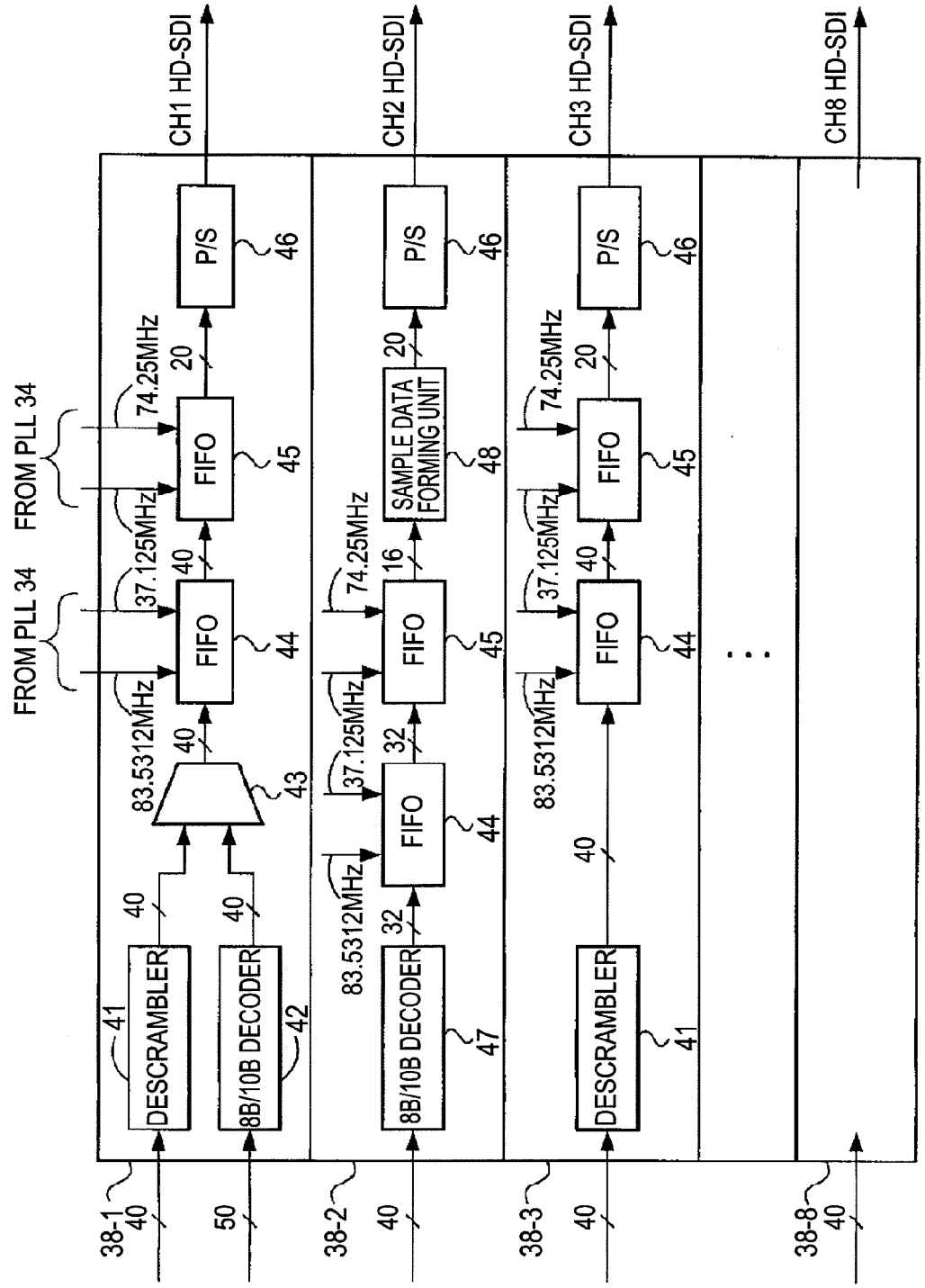
FIG. 17 is a block diagram showing the configuration of an S/P-scramble-8 B/10 B unit.

FIG. 17 is a block diagram showing the configuration of the descramble-8 B/10 B-P/S unit 38. The descramble-8 B/10 B-P/S unit 38 has eight blocks 38-1 to 38-8, each corresponding to CH1 to CH8 one by one.

Among the blocks 38-1, 38-3, 38-5, 38-7 for CH1, CH3, CH5, and CH7, which are Link A, only the block 38-1 has a different configuration from those of the blocks 38-3, 38-5, and 38-7. The blocks 38-3, 38-5, and 38-7 have the same configuration. In FIG. 17, the configuration of the block 38-3 is shown, and the configurations of the blocks 38-5 and 38-7 are omitted. All the blocks 38-2, 38-4, 38-6, 38-8 for CH2, CH4, CH6, and CH8, which are Link B, have the same configuration. In FIG. 17, the configuration of the block 38-2 is shown, and the configurations of the blocks 38-4, 38-6, and 38-8 are omitted. It should be noted that the parts that perform the same process in the blocks are denoted by the same reference numerals.

First, the blocks 38-1, 38-3, 38-5, and 38-7 for Link A are described. In the blocks 38-1, 38-3, 38-5, and 38-7, the input 40-bit width parallel digital data of CH1, CH3, CH5, and CH7 are sent to a descrambler 41. The 40-bit width parallel digital data are the data of the timing reference signal SAV, the active line, the timing reference signal EAV, the line number LN, and the error detection code CRC that have been subjected to self-synchronizing scrambling.

The descrambler 41 is a self-synchronizing type descrambler. The descrambler 41 descrambles the parallel digital data that have been sent thereto, and starts decoding while setting all the register values in the descrambler 41 to 0 immediately before the timing reference signal SAV. It also subjects extra 10 bits of data that have been sent to the descrambling process. Thereby, the carrying of the descrambler, which is a multiplier circuit, can be calculated, and the original data can be reproduced accurately. In addition, it also applies self-synchronizing descrambling to 10 bits of data following the error detection code CRC.

Thereby, although the data of the horizontal blanking period to which self-synchronizing scrambling have been applied are not transmitted, accurate calculation can be performed taking into consideration carrying of the descrambler 41, which is a multiplier circuit, to reproduce the original data. This is also described in the section describing the scrambler 24 (FIG. 6) in the broadcasting camera 1.

After applying self-synchronizing scrambling, the descrambler 41 changes the values of the bits that have been varied channel by channel for each channel of CH1, CH3, CH5, and CH7 and subjected to scrambling into the original values (0, 0) (see FIG. 9). This means that the values of the lower 2 bits of the XYZ in the timing reference signal SAV are changed into the original values (0, 0). The description for these lower 2 bits have already given in the foregoing section describing the scrambler 24.

The 40-bit width parallel digital data descrambled by the descrambler 41 in the block 38-1 are sent to a selector 43. In the block 38-1, the input 50-bit width parallel digital data (the data of the horizontal blanking period of CH1 that have been subjected to 8 B/10 B encoding) are sent to an 8 B/10 B decoder 42. The 8 B/10 B encoder 42 subjects these parallel digital data to 8-bit/10-bit decoding. The 40-bit width parallel digital data subjected to 8-bit/10-bit decoding by the 8 B/10 B decoder 42 are sent to the selector 43.

The selector 43 alternately selects the parallel digital data supplied from the descrambler 41 and the parallel digital data supplied from the 8 B/10 B decoder 42. Thereby, 40-bit width parallel digital data in which all the data for the horizontal lines are unified are formed, and the resulting 40-bit width parallel digital data are sent to the FIFO memory 44.

On the other hand, 50-bit width parallel digital data are not input to the blocks 38-3, 38-5, and 38-7, so neither the 8 B/10 B decoder 42 nor the selector 43 is provided for the blocks 38-3, 38-5, and 38-7. The 40-bit width parallel digital data descrambled by the descrambler 41 are sent to the FIFO memory 44 as they are.

The 40-bit width parallel digital data that have been sent to the FIFO memory 44 are written into the FIFO memory 44, using the 83.5312 MHz clock from the PLL 34 (FIG. 16). Thereafter, the data are read out from the FIFO memory 44 using the 37.125 MHz clock from the PLL 34 while retaining the 40-bit width, and sent to the FIFO memory 45.

The 40-bit width parallel digital data that have been sent to the FIFO memory 45 are written into the FIFO memory 45, using the 37.125 MHz clock from the PLL 34 (FIG. 16). Thereafter, the data are read out from the FIFO memory 45 as parallel digital data with a 20-bit width (each one sample of Link A shown in FIG. 5A) using the 74.25 MHz clock from the PLL 34, and are sent to a P/S (parallel-to-serial) conversion unit 46.

The P/S conversion unit 46 parallel-to-serial converts the parallel digital data into HD-SDI signals with a bit rate of 1.485 Gbps, to reproduce the HD-SDI signals. The HD-SDI signals of CH1, CH3, CH5, and CH7 reproduced in the respective blocks 38-1, 38-3, 38-5, and 38-7 are sent to a 4 k×2 k reproducing unit 39 shown in FIG. 16.

Next, the blocks 38-2, 38-4, 38-6, and 38-8 for Link B will be described. In the blocks 38-2, 38-4, 38-6, and 38-8, the input 40-bit width parallel digital data of CH2, CH4, CH6, and CH8 are sent to an 8 B/10 B decoder 47. The 40-bit width parallel digital data are the data of the timing reference signal SAV, the active line, the timing reference signal EAV, the line number LN, and the error detection code CRC that have been subjected to 8 B/10 B encoding.

The 8 B/10 B encoder 47 subjects these parallel digital data to 8-bit/10-bit decoding. The 32-bit width parallel digital data subjected to 8-bit/10-bit decoding by the 8 B/10 B decoder 47 are sent to the FIFO memory 44.

The 32-bit width parallel digital data that have been sent to the FIFO memory 44 are written into the FIFO memory 44, using the 83.5312 MHz clock from the PLL 34 (FIG. 16). Thereafter, the data are read out from the FIFO memory 44 using the 37.125 MHz clock from the PLL 34 while retaining the 32-bit width, and sent to the FIFO memory 45.

The 32-bit width parallel digital data that have been sent to the FIFO memory 45 are written into the FIFO memory 45, using the 37.125 MHz clock from the PLL 34 (FIG. 16).

Thereafter, the data are read out from the FIFO memory 45 as parallel digital data with a 16-bit width (RGB bits of each one sample of Link B shown in FIG. 5A) using the 74.25 MHz clock from the PLL 34, and are sent to a sample data forming unit 48.

The sample data forming unit 48 forms data of each sample of Link B with 20 bits, in which 4 bits of the bit numbers 0, 1, 8 and 9 of R'G'B'n:0-1 shown in FIG. 5B are added, from the RGB bits of Link B. The 20-bit width parallel digital data formed in this way are sent from the sample data forming unit 48 to the P/S conversion unit 46.

The P/S conversion unit 46 parallel-to-serial converts the parallel digital data into HD-SDI signals with a bit rate of 1.485 Gbps, to reproduce the HD-SDI signals. The HD-SDI signals of CH2, CH4, CH6, and CH8 reproduced in the respective blocks 38-2, 38-4, 38-6, and 38-8 are sent to the 4 k×2 k reproducing unit 39 shown in FIG. 16.

The 4 k×2 k reproducing unit 39 shown in FIG. 16 is a circuit for performing a predetermined process for the HD-SDI signals of CH1 to CH8 (Link A and Link B) sent from the descramble-8 B/10 B-P/S unit 38. This process can reproduce 3840×2160/24P, 25P, 30P/4:4:4/12 bit signals by performing a reverse process of the process (see FIG. 4) of the mapping unit 11 (see FIG. 2) in the broadcasting cameras 1 according to SMPTE 435M.

The 3840×2160/24P, 25P, 30P/4:4:4/12 bit signals reproduced by the 4 k×2 k reproducing unit 39 are output from the CCU 2 and sent to, for example, a VTR (not shown).

It should be noted that not only the 3840×2160/24P, 25P, 30P/4:4:4/12 bit signals are transmitted from the broadcasting cameras 1 to the CCU 2 in this way, but also the foregoing return video is transmitted also from the CCU 2 to the broadcasting cameras 1 via the optical fiber cables 3. The return video is a video signal for displaying video images that are being shot by another broadcasting camera 1. The return video is generated using well-known technology, so the description of the circuit configuration for that purpose will be omitted. For example, the return video may be generated by a process in which HD-SDI signals for 2 channels are subjected to 8-bit/10-bit encoding, and thereafter the signals are multiplexed and converted into serial digital data.

Figure 18:
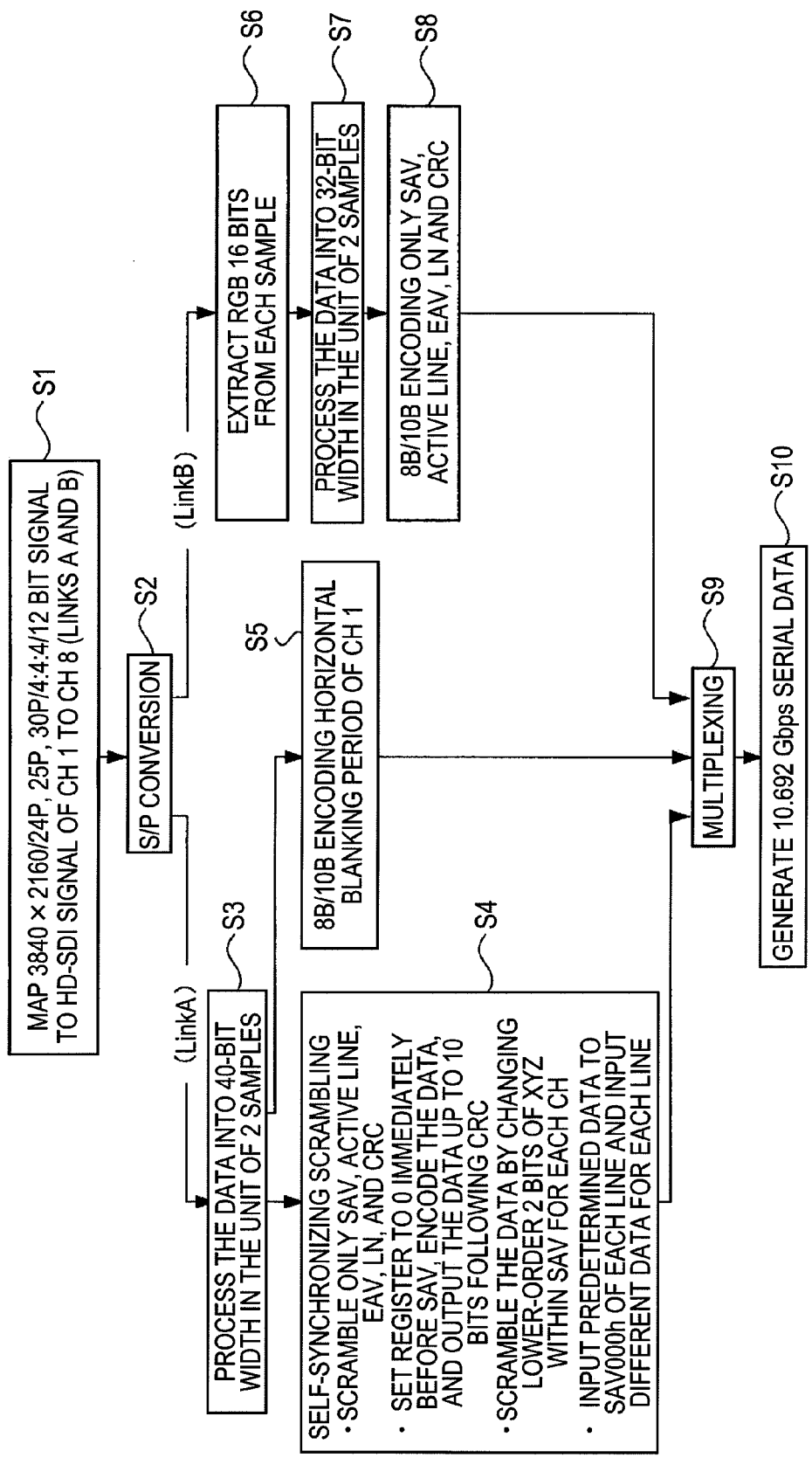
FIG. 18 is a flowchart showing the outline of the processing in the broadcasting camera.

FIGS. 18 and 19 are flow-charts showing the outline of the above-described processes of the broadcasting cameras 1 and the CCU 2 for transmission of 3840×2160/24P, 25P, 30P/4:4:4/12 bit signals.

Example of the Process in the Broadcasting Camera

In the broadcasting camera 1, 3840×2160/24P, 25P, 30P/4:4:4/12 bit signals are mapped to HD-SDI signals of CH1 to CH8 (step S1), as shown in FIG. 18. CH1 to CH8 include Link A, which contain CH1, CH3, CH5, and CH7, and Link B, which contain CH2, CH4, CH6, and CH8. The mapping in the broadcasting camera 1 is performed according to 5.4 Octa Link 1.5 Gbps Class of SMPTE 435M, Part 1. This step S1 is a process of the mapping unit 11 shown in FIG. 2.

Subsequently, the HD-SDI signals are serial-to-parallel converted (step S2). The data of Link A are made into 40-bit width data in the unit of 2 samples (step S3), and thereafter, self-synchronizing scrambling is applied thereto. At this time, the self-synchronizing scrambling is applied only to the data of the timing reference signal SAV, the active line, the timing reference signal EAV, the line number LN, and the error detection code CRC. Then, encoding is performed while setting all the register values in the scrambler to 0 immediately before the timing reference signal SAV. Up to 10 bits of data following the error detection code CRC are output. The self-synchronizing scrambling is applied while varying the values of the lower 2 bits of the XYZ in the timing reference signal SAV channel by channel. Then, the timing reference signal SAV specified as 000h, 000h, 000h, 000h in each line is rewritten into predetermined values, and different data are placed for line by line. (Step S4).

In addition, as for CH1, the data of the horizontal blanking period is subjected to 8-bit/10-bit encoding (step S5).

On the other hand, as for Link B, RGB bits are extracted from the data of each sample (step S6). Then, the RGB bits are processed into 32-bit width data in the unit of 2 samples (step S7). Then, only the data of the timing reference signal SAV, the active line, the timing reference signal EAV, the line number LN, and the error detection code CRC are subjected to 8 B/10 B encoding (step S8). These steps S2 to S8 are the processes of the S/P-scramble-8 B/10 B unit 12 shown in FIGS. 2 and 6.

The data of Link A to which self-synchronizing scrambling is applied in this way and the data of Link B that are subjected to 8-bit/10-bit encoding in this way are multiplexed (step S9). Then, serial digital data with a bit rate of 10.692 Gbps are generated from the multiplexed parallel digital data (step S10). This step S9 is the process of the multiplexing unit 14 shown in FIG. 2, and the step S10 is the processes from the data length conversion unit 15 to the multiplex-P/S conversion unit 18 shown in FIG. 2.

Example of the Processes in the CCU

As shown in FIG. 19, in CCU 2, parallel digital data are generated from the serial digital data with a bit rate of 10.692 Gbps (step S11). Then, the parallel digital data are separated into the data of the channels of Link A and Link B (step S12). This step S11 is the processes from the S/P conversion and multi-channel data forming unit 32 to the data length conversion unit 36 shown in FIG. 16, and the step S12 is the process of the separating unit 37 shown in FIG. 16.

Subsequently, self-synchronizing descrambling is applied to Link A. Here, decoding is started while setting all the values of the registers in the descrambler to 0 immediately before the timing reference signal SAV, and the self-synchronizing descrambling is also applied to up to 10 bits of data following the error detection code CRC. In addition, after applying the self-synchronizing scrambling, the values of the lower 2 bits of the XYZ in the timing reference signal SAV are set back to (0, 0). Then, the data of the SAV in each line in which varied data are inserted are set back to the original data (step S13).

In addition, as for CH1, the data of the horizontal blanking period is subjected to 8 B/10 B decoding (step S14).

Then, data for each one sample are separated (step S15), and the separated parallel digital data are parallel-to-serial converted to reproduce the HD-SDI signals of Link A (step S16).

On the other hand, the data of Link B are subjected to 8 B/10 B decoding (step S17), and RGB bits for each one sample are separated (step S18). Subsequently, data for each sample of Link B are formed from the RGB bits (step S19). Then, the parallel digital data formed in this way are parallel-to-serial converted to reproduce the HD-SDI signals of Link B (step S20). These steps S13 to S20 are the processes of the descramble-8 B/10 B-P/S unit 38 shown in FIGS. 16 and 18.

Then, 3840×2160/24P, 25P, 30P/4:4:4/12 bit signals are reproduced from the reproduced HD-SDI signals of Link A and Link B (step S21). This step S21 is a process of the 4 k×2 k reproducing unit 39 shown in FIG. 16.

As has been described above, in this camera transmission system the timing reference signal SAV specified as 000h, 000h, 000h, 000h, among the data of the horizontal lines in Link A that have been serial-to-parallel converted, is rewritten into predetermined values. These data are scrambled, and as a result, the values of the timing reference signal SAV become different values even with a flat field video signal. Therefore, even when certain data are scrambled and thereby converted into data indicating an error signal, these data indicating the error signal do not continue. This leads to an advantage that a flat field video signal can be output in a suitable manner.

In addition, the 3840×2160/24P, 25P, 30P/4:4:4/12 bit signals are mapped to HD-SDI signals of 8 channels, CH1 to CH8 (Link A and Link B), according to a predetermined transmission standard. The transmission standard in this embodiment is 5.4 Octa Link 1.5 Gbps Class of SMPTE 435M, Part 1. As a result, it is possible to transmit the data by converting them into serial digital data with a bit rate of 10.692 Gbps. At this time, in the case where the 3840×2160/24P, 25P, 30P/4:4:4/12 bit signals are flat data, the data values become identical between Chs. 1, 3, 5, and 7 and Chs. 2, 4, 6, and 8. This is undesirable because EMI or the like occurs. In view of this, at the time of scrambling, 000h, 000h, 000h, and 000h in the SAV are rewritten into CLN0, YLN0, CLN1, and YLN1 following the EAV in the same line of the input HD-SDI. In addition, the lower 2 bits of XYZ (reserve 0) are changed channel by channel, and scrambling is performed. Thereby, data uniformity can be avoided not only for each of the Chs. 1, 3, 5, and 7, but also for a flat field.

In addition, in the broadcasting camera 1, which is the transmission side, encoding is performed while setting all the values of the registers in the scrambler 24 to 0 immediately before the timing reference signal SAV, and up to 10 bits of data that follow the error detection code CRC are output. In the CCU 2, which is the reception side, decoding is started while setting all the values of the registers in the descrambler 41 to 0 immediately before the timing reference signal SAV, and the descrambling is also applied to up to 10 bits of data following the error detection code CRC. As a result, the original data can be reproduced accurately in the CCU 2, which is the reception side, although the data of the horizontal blanking period to which self-synchronizing scrambling is applied are not transmitted.

2. Modified Examples

Although the invention is applied to a camera transmission system in the foregoing embodiment, the invention may be applied to any system that transmits 3840×2160/24P, 25P, 30P/4:4:4/12 bit signals.

Moreover, the numerical values for rewriting (000h, 000h, 000h, 000h) in the SAV may be other numerical values used in the foregoing embodiment. For example, the timing reference signal SAV specified as 000h, 000h, 000h, 000h may be rewritten into random numerical values. It is also possible to rewrite the timing reference signal SAV specified as 000h, 000h, 000h, 000h sequentially into 000h, 000h and a line number: LN0, LN1, following the timing reference signal EAV contained in Link A, in that order. It is also possible to rewrite the timing reference signal SAV specified as 000h, 000h, 000h, 000h sequentially into a line number: LN0, LN1, following the timing reference signal EAV contained in Link A, and 000h, 000h, in that order.

The present application contains subject matter related to that disclosed in Japanese Priority Patent Application JP 2008-263243 filed in the Japan Patent Office on Oct. 9, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal transmission apparatus comprising:
 a serial-to-parallel converter to convert HD-SDI format serial digital video signals of Link A, containing CH1, CH3, CH5, and CH7, and Link B, containing CH2, CH4, CH6, and CH8, mapped according to a predetermined transmission standard;
 a scrambler configured, before performing scrambling, to rewrite a timing reference signal SAV specified as 000h, 000h, 000h, 000h by sequentially rewriting into a line number: LN0, LN0, LN1, LN1, following the timing reference signal EAV contained in Link A, in that order, among data of horizontal, lines in Link A that are serial-to-parallel converted by the serial-to-parallel converter, into a predetermined value, configured to apply self-synchronizing scrambling to only data of the rewritten timing reference signal SAV, an active line, a timing reference signal EAV, a line number LN, and an error detection code CRC, configured to perform encoding while setting all the register values in the scrambler to 0 immediately before the timing reference signal SAV, and configured to output at least up to several bits of data following the error detection code CRC;
 a bit extractor to extract RGB bits only from the data of the timing reference signal SAV, the active line, the timing reference signal EAV, the line number LN, and the error detection code CRC, among data of horizontal lines in Link B that are serial-to-parallel converted by the serial-to-parallel converter;
 an 8-bit/10-bit encoder configured to subject the RGB bits of Link B extracted by the hit extractor to 8-bit/10-bit encoding;
 a multiplexing unit configured to multiplex parallel digital data of Link A to which self-synchronizing scrambling is applied by the scrambler and parallel digital data of Link B subjected to 8-bit/10-bit encoding by the 8 bit/10 bit encoder; and
 a serial digital data generator to generate serial digital data with a predetermined bit rate from the parallel digital data multiplexed by the multiplexing unit.

2. A signal transmission apparatus comprising:
 a serial-to-parallel converter to convert HD-SDI format serial digital video signals of Link A, containing CH1, CH3, CH5, and CH7, and Link B, containing CH2, CH4, CH6, and CH8, mapped according to a predetermined transmission standard;
 a scrambler configured, before performing scrambling, to rewrite a timing reference signal SAV specified as 000h, 000h, 000h, 000h by rewriting into random numerical values, among data of horizontal lines in Link A that are serial-to-parallel converted by the serial-to-parallel converter, into predetermined value, configured to apply self-synchronizing scrambling to only data of the rewritten timing ref signal SAV, an active line, a timing reference signal EAV, a line number LN, and an error detection code CRC, configured to perform encoding while setting all the register values in the scrambler to 0 immediately before the timing reference signal SAV, and configured to output at least up to several bits of data following the error detection code CRC;
 a bit extractor to extract RGB bits only from the data of the timing reference signal SAV, the active line, the timing reference signal EAV, the line number LN, and the error detection code CRC, among data of horizontal lines in Link B that are serial-to-parallel converted by the serial-to-parallel converter;
 an 8-bit/10-bit encoder configured to subject the RGB bits of Link B extracted by the bit extractor to 8-bit/10-bit encoding;
 a multiplexing unit configured to multiplex parallel digital data of Link A to which self-synchronizing scrambling is applied by the scrambler and parallel digital data of Link B subjected to 8-bit/10-bit encoding by the 8 bit/10 bit encoder; and
 a serial digital data generator to generate serial digital data with a redetermined hit rate from the parallel digital data multiplexed by the multiplexing unit.

3. A signal transmission apparatus comprising:
 a serial-to-parallel converter to convert HD-SDI format serial digital video signals of Link A, containing CH1, CH3, CH5, and CH7 and Link B, containing, CH2, CH4, CH6, and CH8, mapped according to a redetermined transmission standard;
 a scrambler configured, before performing scrambling, to rewrite a timing reference signal SAV specified as 000h, 000h, 000h, 000h by sequentially rewriting into 000h, 000h, and a line number: LN0, LN1, following the timing reference signal EAV contained in Link A, in that order, among data of horizontal lines in Link A that are serial-to-parallel converted by the serial-to-parallel converter, into a predetermined value, configured to apply self-synchronizing scrambling to only data of the rewritten timing reference signal SAV, an active line, a timing reference signal EAV, a line number LN, and an error detection code CRC, configured to perform encoding while setting all the register values in the scrambler to 0 immediately before the timing reference signal SAV, and configured to output at least up to several bits of data following the error detection code CRC;
 a bit extractor to extract RUB bits only from the data of the timing reference signal SAV, the active line, the timing reference signal EAV, the line number LN, and the error detection code CRC, among data of horizontal lines in Link B that are serial-to-parallel converted by the serial-to-parallel converter;
 an 8-bit/10-bit encoder configured to subject the RGB bits of Link B extracted by the bit extractor to 8-bit/10-bit encoding;
 a multiplexing unit configured to multiplex parallel digital data of Link A to which self-synchronizing scrambling is applied by the scrambler and parallel digital data of Link B subjected to 8-bit/10-bit encoding by the 8 bit/10 bit encoder; and
 a serial digital data generator to generate serial digital data with a predetermined bit rate from the parallel digital data multiplexed by the multiplexing unit.

4. A signal transmission apparatus comprising:
 a serial-to-parallel converter to convert HD-SDI format serial digital video signals of Link A, containing CH1, CH3, CH5, and CH7, and Link B, containing CH2, CH4, CH6, and CH8, mapped according to a redetermined transmission standard;
 a scrambler configured before performing scrambling, to rewrite a timing reference signal SAV specified as 000h, 000h, 000h, 000h by sequentially rewriting into a line number: LN0, LN1, following the timing reference signal EAV contained in Link A, and 000h, 000h, in that order, among data of horizontal lines in Link A that are serial-to-parallel converted by the serial-to-parallel converter, into a predetermined value, configured to apply self-synchronizing scrambling to only data of the rewritten timing reference signal SAV, an active line, a timing reference signal EAV, a line number LN, and an error detection code CRC, configured to perform encoding while setting all the register values in the scrambler to 0 immediately before the timing reference signal SAV, and configured to output at least up to several bits of data following the error detection code CRC;

a bit extractor to extract RGB bits only from the data of the timing reference signal SAV, the active line, the timing reference signal EAV, the line number LN, and the error detection code CRC, among data of horizontal lines in Link B that are serial-to-parallel converted by the serial-to-parallel converter;

an 8-bit/10-bit encoder configured to subject the RGB bits of Link B extracted by the bit extractor to 8-bit/10-bit encoding;

a multiplexing unit configured to multiplex parallel digital data of Link A to which self-synchronizing scrambling is applied by the scrambler and parallel digital data of Link B subjected to 8-bit/10-bit encoding by the 8 bit/10 bit encoder; and a serial digital data generator to generate serial digital data with a predetermined bit rate from the parallel digital data multiplexed by the multiplexing unit.

* * * * *